United States Patent [19]
Marks

[11] Patent Number: 6,117,526
[45] Date of Patent: *Sep. 12, 2000

[54] SLIP RESISTANT APPLIQUE APPARATUS FOR GRASPING

[76] Inventor: Ira M. Marks, 210 Durazno Way, Portola Valley, Calif. 94028

[*] Notice: This patent issued on a continued prosecution application filed under 37 CFR 1.53(d), and is subject to the twenty year patent term provisions of 35 U.S.C. 154(a)(2).

[21] Appl. No.: 08/739,610

[22] Filed: Oct. 30, 1996

Related U.S. Application Data

[63] Continuation of application No. 08/432,002, May 1, 1995, abandoned, which is a continuation of application No. 08/221,861, Mar. 31, 1994, abandoned.

[51] Int. Cl.[7] ..................................................... B32B 23/02
[52] U.S. Cl. .......................... 428/192; 428/40.1; 428/409
[58] Field of Search .................................. 428/40, 42, 43, 428/76, 174, 192, 195, 198, 212, 221; 409/343, 411.1, 488.4, 914; 427/185

[56] References Cited

U.S. PATENT DOCUMENTS

| | | | |
|---|---|---|---|
| 3,836,420 | 9/1974 | Freese | 161/19 |
| 4,328,274 | 5/1982 | Tarbutton et al. | 428/149 |
| 4,625,344 | 12/1986 | Howard | 4/581 |
| 4,911,734 | 3/1990 | Short | 8/471 |
| 4,931,330 | 6/1990 | Stier et al. | 428/40 |

OTHER PUBLICATIONS

Article from Newsweek Magazine, "Get a Grip on Technology", Oct. 17, 1994.
Article from EDN Magazine, "Hot Technologies at Comdex Fall '95 (editorial opinion)", Dec. 22, 1994.
"3M Technical Data" Safety–Walk™ Antislip Material, Home and Commercial Care Division, 3M Center, Building 223–3N–05, St. Paul, MN 55144–1000.
"3M Traction Systems" Sales Brochure, Home and Commercial Care Division, 3M Center, Building 223–3N–05, St. Paul, MN 55144–1000.

*Primary Examiner*—Richard Weisberger
*Attorney, Agent, or Firm*—Blakely, Sokoloff, Taylor & Zafman, LLC

[57] ABSTRACT

Conformable strips are constructed from a resilient dimensionally stable material that has a high friction textured top surface. The bottom surface of each strip is coated with a pressure-sensitive adhesive that is used to attach the strip to the exterior surface of the portable computer thereby providing a secure gripping surface to the portable computer. The adhesive permits easy application of the strips to the smooth surface of the computer. The strips are constructed of flexible resilient material so that they can conform to curved flat surfaces when applied thereto. Additional antislip characteristics are obtained by applying successive strips side by side and spaced apart. The openings between the strips provide a multi-edge tread like surface to bind with the hand. Furthermore, the material used to form the strips has sufficient thickness and edge definition to provide a mechanical stop to bind with the flesh of a grasping hand. Additional edges are incorporated into wider strips by making cut outs of sufficient size to permit the flesh to conform to the cavities and to grab the edges of the cavities. Alternatively, effective gripping surfaces are also created by affixing a pattern of a series of smaller spots or other geometric shapes that are made of the antislip material. The pattern of the spots is formed so that they are separated by sufficient distance to provide multiple edges and textured surfaces thereby allowing the flesh to conform over multiple edges and surfaces to provide antislip characteristics beyond that of a single strip.

5 Claims, 25 Drawing Sheets

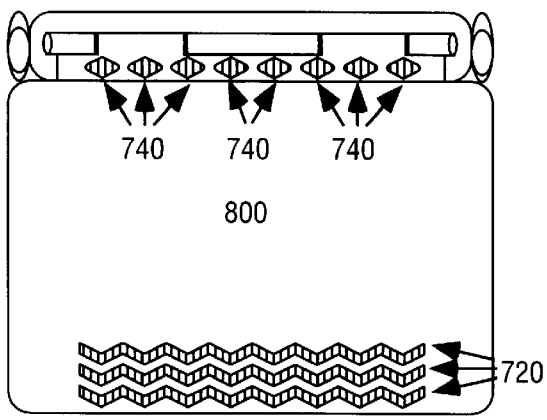
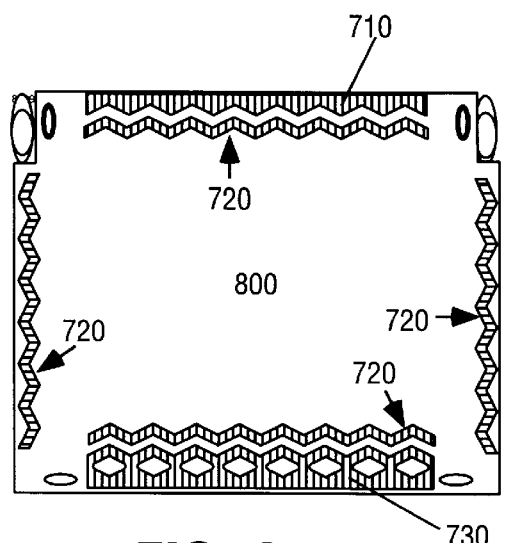
FIG. 8
FIG. 9
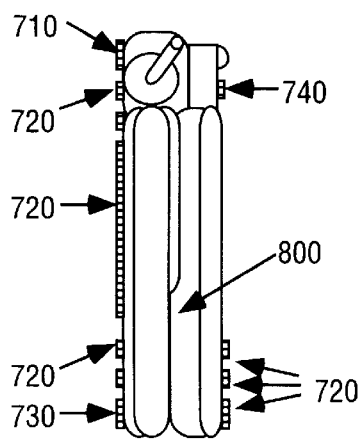
FIG. 10
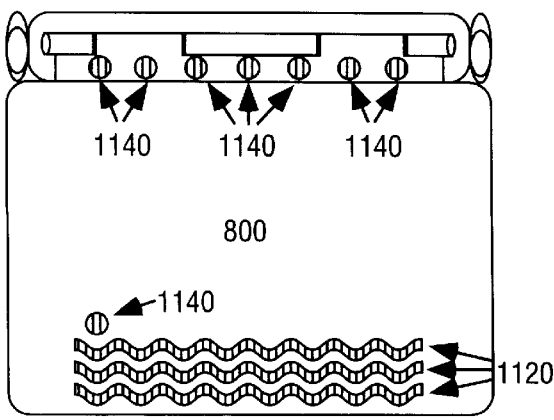
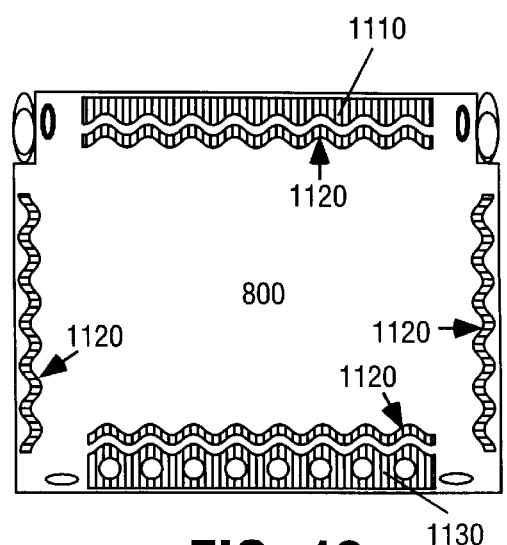
FIG. 12
FIG. 13

SLIP RESISTANT APPLIQUE APPARATUS FOR GRASPING

This is a continuation of application Ser. No. 08/432,002, filed May 1, 1995, now abandoned, which is a continuation of application Ser. No. 08/221,861, filed Mar. 31, 1994, now abandoned.

BACKGROUND OF THE INVENTION

1. Related Applications

This application is related to co-pending design patent application Ser. No. 29/020,822, entitled "Textured Appliqué", filed concurrently herewith now Pat. No. D370,351.

2. Field of the Invention

This invention relates to the general field of computers, and more particularly, to an apparatus for grasping a portable computer.

3. Art Background

A portable computer is any computer designed to be moved easily. Portable computers can be characterized by size and weight ranging from a transportable computer to a hand-held computer. A transportable computer (also called a luggable computer) weighs between fifteen and thirty-five pounds. A transportable computer usually has floppy and hard drives, a standard CRT (cathode ray tube) and operates off of house current.

By contrast, a laptop computer typically weighs between eight and fifteen pounds and is called a laptop because it can be held on the lap while it is being used. A laptop computer usually has floppy and hard drives, a flat LCD (liquid crystal display) or plasma screen and operates off of batteries or house current.

Even lighter yet is an ultralight computer. An ultralight computer typically weighs between two and eight pounds and is easy to carry in a briefcase. A laptop computer usually has floppy and hard drives. Alternately, a laptop computer may have a solid state storage device that is used in place of the mechanical floppy and hard drives. A RAM (random access memory) drive or an EPROM (erasable programmable read only memory) are examples of solid state storage devices. Like the laptop computer, a typical ultralight computer has a flat LCD or plasma screen and operates off of batteries. To reduce weight, however, rather than operating directly off of house current, an ultralight computer will typically have a separate transformer pack that is used transform house current to direct current. The transformer pack is used to charge the batteries and to provide power directly to the computer.

Thinner ultralight models are known as notebook computers because they have dimensions that are roughly the same as those of a notebook. A common design for a notebook computer is called a "clam-shell" because the case of the computer hinges along one edge and pivots open like a clam shell to reveal a keyboard in one part and a display screen in the other.

Finally, a hand-held computer is a portable computer that typically weighs less than two pounds. It is called a hand-held because it can be held in the hand while it is being used. A hand-held computer typically operates off of batteries or a transformer pack. A hand-held computer may have a hard drive or a solid state drive but usually does not have a floppy drive. Because of its small size, a hand-held computer typically does not have a standard sized keyboard.

Portable computers typically have a hard plastic exterior that is smooth and generally slippery. This is the case with other types of exteriors, for example, cases made of a metal such as aluminum can also be smooth and generally slippery. The smooth and slippery textured surface of a portable computer can prevent users from obtaining an effective grasp on the computer. In the event that a user can obtain a grasp, the smooth and slippery textured surface of a portable computer can prevent user from maintaining the grasp. Thus the user can inadvertently lose the grasp on the unit and drop it. Therefore, some portable computers have handles that can be used to securely grasp the computers when they are being moved or carried. A handle permits the user to obtain a firm grasp and therefore avoid dropping the unit. The lighter weight units typically do not have a carrying handle, however, because a handle adds bulk and weight to the unit. Instead, when computers without handles are being moved or carried, they are meant to be placed in a briefcase or a special carrying case that has a handle. The lack of a handle exposes the unit to the risk of being inadvertently dropped. This risk of being dropped happens whenever the computer is being handled. For example, the risk of being dropped occurs: when the computer is being used, when it is being carried about without being first placed into a briefcase or carrying case, when it is being placed into a briefcase or carrying case for transport and when it is being removed from a briefcase or carrying case after transport.

Furthermore, one of the key advantages of a portable computer is that it can be easily moved. This enables a portable computer to be kept readily accessible wherever a user may go. Requiring a user to pack the personal computer into a case for transport, however, imposes an inconvenient constraint upon the use of the computer. The user is tempted to forgo the use of the case so that the computer can be accessed readily. This is so even though this practice increases the risk that the unit will be inadvertently dropped. Even in the case of units having handles, the small size and weight of the computer tempts the user into not using the handle when grasping the computer.

Portable computers are valuable. If a portable computer is inadvertently dropped, the machine may break. This can cause the loss of the use of the machine, require the expenditure of a considerable amount of money to replace or repair the broken machine and can also cause the loss of precious data stored within the machine.

SUMMARY OF THE INVENTION

It is an object of the present invention to provide a way to securely grasp a portable computer.

It is also an object of the present invention to provide a way to securely grasp a portable computer without substantially increasing the bulk or weight of the portable computer.

It is a further object of the present invention to provide a way to securely grasp a portable computer without hindering access to the portable computer when the computer is being used.

It is yet another object of the present invention to easily retrofit an existing portable computer to provide a way to securely grasp the portable computer.

Furthermore, it is an object of the present invention to satisfy the above-mentioned objects of the present invention in a way that is inexpensive to implement.

An apparatus is disclosed for providing a secure gripping surface to a portable computer. Conformable strips are constructed from a resilient dimensionally stable material that has a high friction textured top surface. The bottom surface of each strip is coated with a pressure-sensitive adhesive that is used to attach the strip to the exterior surface of the portable computer. The adhesive permits easy application of the strips to the smooth surface of the computer. The strips are constructed of flexible resilient material so that they can conform to curved surfaces when applied thereto.

The slip resistant textured surface of the self adhesive strips provides a rough textured surface to the portable computer. The antislip surface of the strips allows a user to obtain and maintain a better grasp on the computer. The result is a significantly reduced likelihood of damage caused by inadvertent dropping thereby yielding a significantly improved ability to handle the computer.

Additional antislip characteristics are obtained by applying successive strips side by side and spaced apart. The openings between the strips provide a multi-edge tread like surface to bind with the hand. Furthermore, the material used to form the strips has a sufficient thickness and edge definition to provide a mechanical stop or bind with the flesh of a grasping hand. Thus the strips provide additional antislip characteristics for grabbing.

The application of successive strips that are separated to allow the flesh of the hand to conform over multiple edges and textured surfaces provides antislip characteristics beyond that of a wide single strip. Additional edges, however, are incorporated into wider strips by making cut outs of sufficient size to permit the flesh to conform to the cavities and to grab the edges of the cavities.

Effective gripping surfaces are also created by affixing a pattern of a series of smaller spots or other geometric shapes that are made of the antislip material. The pattern of the spots is formed such that the shapes are separated by sufficient distance to provide multiple edges and textured surfaces thereby allowing the flesh to conform over multiple edges and surfaces to provide antislip characteristics beyond that of a single strip.

BRIEF DESCRIPTION OF THE DRAWINGS

The objects, features, and advantages of the apparatus of the present invention will be apparent from the following detailed description of the invention in which:

FIG. 8 illustrates a front view of a portable computer that has had appliqués from the zig-zag set of FIG. 7 affixed according to the present invention to provide an enhanced gripping surface;

FIG. 9 illustrates a back view of a portable computer that has had appliqués from the zig-zag set of FIG. 7 affixed according to the present invention to provide an enhanced gripping surface;

FIG. 10 illustrates a side view of a portable computer that has had appliqués from the zig-zag set of FIG. 7 affixed according to the present invention to provide an enhanced gripping surface;

FIG. 12 illustrates a front view of a portable computer that has had appliqués from the wave set of FIG. 11 affixed according to the present invention to provide an enhanced gripping surface;

FIG. 13 illustrates a back view of a portable computer that has had appliqués from the wave set of FIG. 11 affixed according to the present invention to provide an enhanced gripping surface;

DETAILED DESCRIPTION OF THE INVENTION

In the following description, for purposes of explanation, specific numbers, materials and configurations are set forth in order to provide a thorough understanding of the present invention. It will be apparent to one skilled in the art, however, that the present invention can be practiced without these specific details. In other instances, well known systems are shown in diagrammatic or block diagram form in order not to obscure the present invention unnecessarily.

Figure 1:
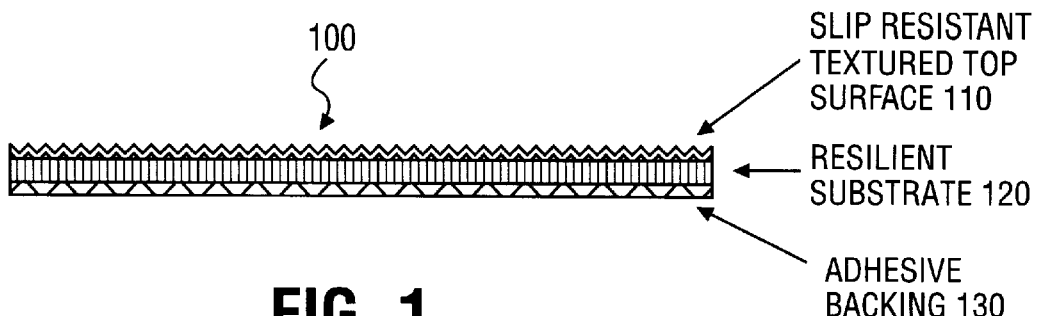
FIG. 1 illustrates a side view of an appliqué of the present invention.

FIG. 1 illustrates a side view of an appliqué of the present invention. In FIG. 1, appliqué 100 is formed by imparting a slip resistant textured top surface and adhesive backing 130 to resilient substrate 120. Conformable strips are constructed from a light weight resilient dimensionally stable material that has a high friction textured top surface 120. The bottom surface of each strip is coated with a pressure-sensitive adhesive 130 that is used to attach the strip to the exterior surface of the portable computer. The adhesive permits easy application of the strips to the smooth surface of the computer. The strips are constructed of flexible resilient material so that they can conform to curved surfaces when applied thereto. Thus, one can easily and inexpensively retrofit a portable computer with the strips and thereby enhance the ability to grip and handle the computer without obstructing access to the unit.

In one embodiment, appliqué 100 is formed from the family of Safety-Walk™ Antislip Material manufactured by 3M, Home and Commercial Care Division, Saint Paul, Minn. (Safety-Walk™ is a trademark of 3M).

Thus, in a first embodiment, appliqué 100 is formed from Safety-Walk™ General Purpose Antislip. Safety-Walk™ General Purpose Antislip is a high friction textured material. General Purpose Antislip consists of abrasive mineral particles bonded by a tough, durable polymer to a dimensionally stable plastic film. The backing is coated with a pressure-sensitive adhesive covered by a removable protective liner.

In a second embodiment, appliqué 100 is formed from Safety-Walk™ Conformable Antislip. Safety-Walk™ Conformable Antislip is a high friction textured material. Conformable Antislip consists of abrasive particles bonded by a tough, durable polymer to an aluminum foil backing. The backing is coated with a pressure-sensitive adhesive covered by a removable protective liner.

In a third embodiment, appliqué 100 is formed from Safety-Walk™ Resilient Antislip—Medium Grade. Safety-Walk™ Resilient Antislip—Medium Grade is a high friction resilient textured material. The product consists of a dimensionally stable plastic film coated with a textured resilient surface. The reverse surface is coated with a pressure-sensitive adhesive covered by a removable protective liner.

In a fourth embodiment, appliqué 100 is formed from Safety-Walk™ Resilient Antislip—Fine Grade. Safety-Walk™ Resilient Antislip—Fine Grade is a high friction resilient textured material. The product consists of a fine textured resilient surface. The reverse surface is coated with a pressure-sensitive adhesive covered by a removable protective liner.

The Safety-Walk™ Antislip Material family is merely representative of possible materials that can be used to form appliqué 100. In alternate embodiments, alternate materials having characteristics similar to those of the Safety-Walk™ Antislip Material family are used.

Figure 2:
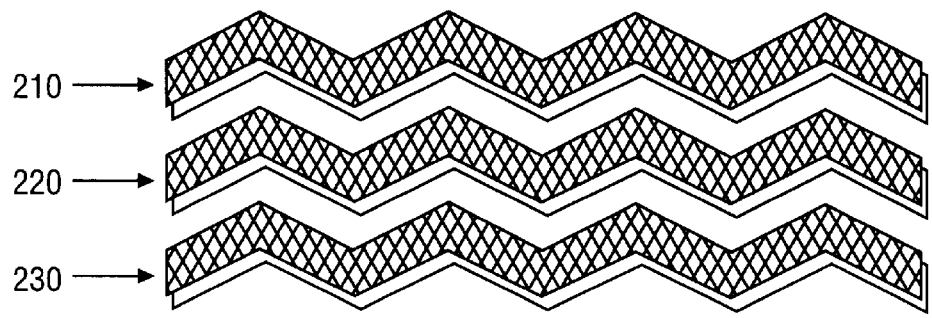
FIG. 2 illustrates a perspective view of a series of successive appliqué strips placed side by side.

FIG. 2 illustrates a perspective view of a series of successive appliqué strips placed side by side. In FIG. 2, strips 210, 220 and 230 are arranged so that a first gap is formed between strips 210 and 220 and a second gap is formed between strips 220 and 230. Strips 210, 220 and 230 each have a serpentine design. The serpentine design of strips 210, 220 and 230 is superior to that of linear strips because strips 210, 220 and 230 can be grasped by a finger when the finger is oriented over a wide range of directions with respect to the strips. Furthermore, the convex portions of the serpentine design provide protruding surfaces that can dig into the flesh of the finger thereby increasing the ability to grasp. Moreover, the concave portions of the serpentine design provide recessed surfaces that can pinch the flesh of the finger thereby further increasing the ability to grasp.

Figure 3:
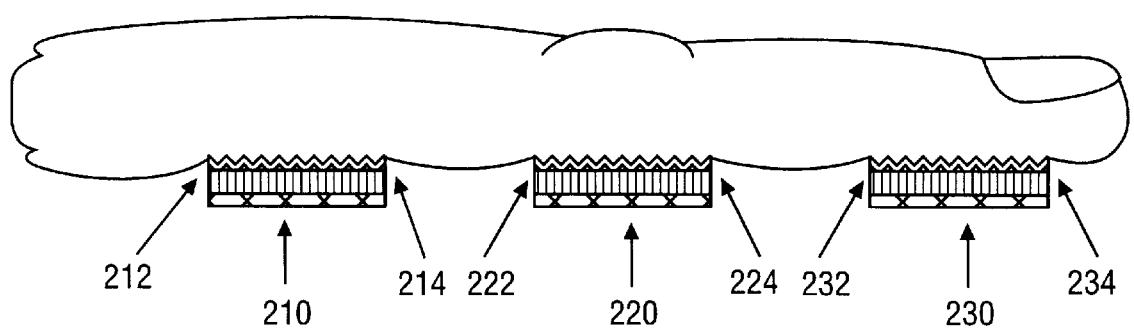
FIG. 3 illustrates a finger conforming to the spaces between successive appliqué strips when grasping a portable computer.

FIG. 3 illustrates a finger conforming to the spaces between successive appliqué strips when grasping a portable computer. In FIG. 3, the finger has been placed so that it makes contact with the textured side of strips 210, 220 and 230 of FIG. 2. Note that strips 210, 220 and 230 have been spaced apart at a distance that permits a fleshy portion of the finger between each finger joint to conform to the gap between the strips to supplement the conformation of the flesh of the finger to the textured surface of the strips. Thus, the slip resistant textured surface of the self adhesive strips 210, 220 and 230 provides a rough textured surface to the portable computer. The antislip surface of the strips allows a user to obtain and maintain a better grasp on the computer than that provided by the smooth surface of the computer. The result is a significantly reduced likelihood of damage caused by inadvertent dropping thereby yielding a significantly improved ability to handle the computer.

Additional antislip characteristics are obtained by applying strips 210, 220 and 230 side by side successively and spacing them apart. The openings between the strips provide a multi-edge tread like surface to bind with the hand. Furthermore, the material used to form the strips has a sufficient thickness and edge definition to provide a mechanical stop or bind with the flesh of a grasping hand. Therefore strips 210, 220 and 230 provide additional antislip characteristics for grabbing beyond that provided by a single wide strip.

Thus, it can be seen in FIG. 3 that the finger conforms itself about strip 210 so that edges 212 and 214 of strip 210 form a mechanical stop that increases the gripping ability of the finger. Furthermore, the finger conforms itself about strip 220 so that edges 222 and 224 of strip 220 form a mechanical stop that increases the gripping ability of the finger. Moreover, the finger conforms itself about strip 230 so that edges 232 and 234 of strip 230 form a mechanical stop that increases the gripping ability of the finger. Alternately, flesh of other parts of the body, such as the arm, hand and/or thumb can be made to conform about strips 210, 220 and 230 when the portable computer is grasped. This is the case even when covered by material. Thus, a gloved finger or thumb can conform about strips 210, 220 and 230 and the arm can conform about strips 210, 220 and 230 when the arm is inside a sleeve.

In the case of a laptop computer, strips 210, 220 and 230 can conform to the lap to reduce the likelihood that the computer will slide off of the lap. Furthermore, the convex portions of the serpentine design provide protruding surfaces that can dig into the material thereby reducing the likelihood that the computer will slide off of the lap. Moreover, the concave portions of the serpentine design provide recessed surfaces that can pinch the material thereby reducing the likelihood that the computer will slide off of the lap.

Figure 4:
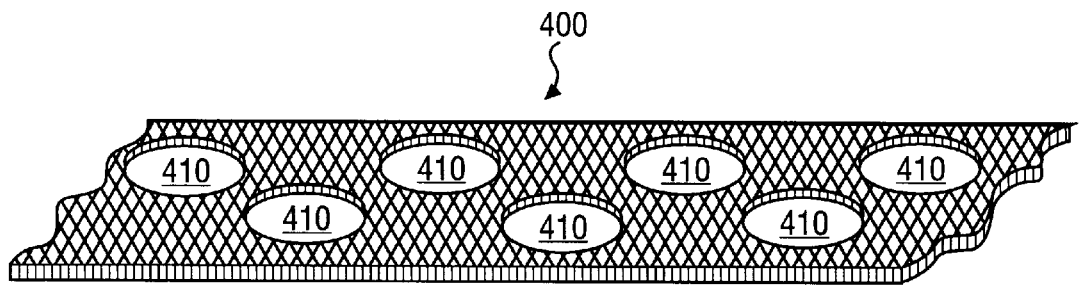
FIG. 4 illustrates a perspective view of a wide appliqué strip that has cavities formed according to the present invention to provide an enhanced gripping surface.

FIG. 4 illustrates a perspective view of a wide appliqué strip that has cavities formed according to the present invention to provide an enhanced gripping surface. The application of successive strips that are separated to allow the flesh of the hand to conform over multiple edges and textured surfaces as shown in FIGS. 2 and 3 provides antislip characteristics beyond that of a wide single strip. In FIG. 4, however, additional edges are incorporated into a wider strip 400 by making cavities 410 of sufficient size to permit the flesh to conform to the cavities 410 and to grab the edges of the cavities 410. Cavities 410 can be pocket deformations, or, alternately, cavities 410 can extend through strip 400 as cut outs.

Figure 5:
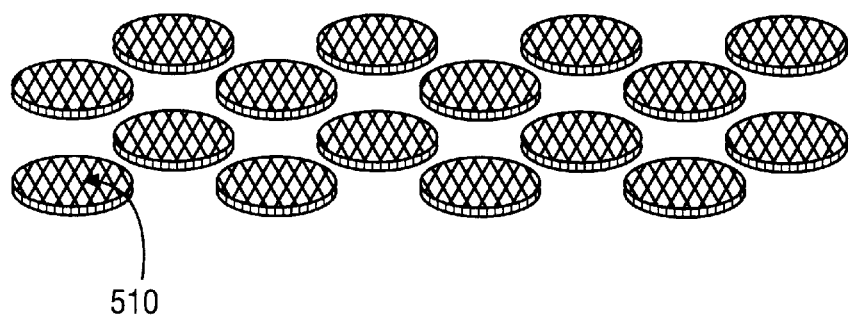
FIG. 5 illustrates a perspective view of a set of tabs formed according to the present invention from the cavities of the wide appliqué strip of FIG. 4 to provide an enhanced gripping surface.
Figure 6:
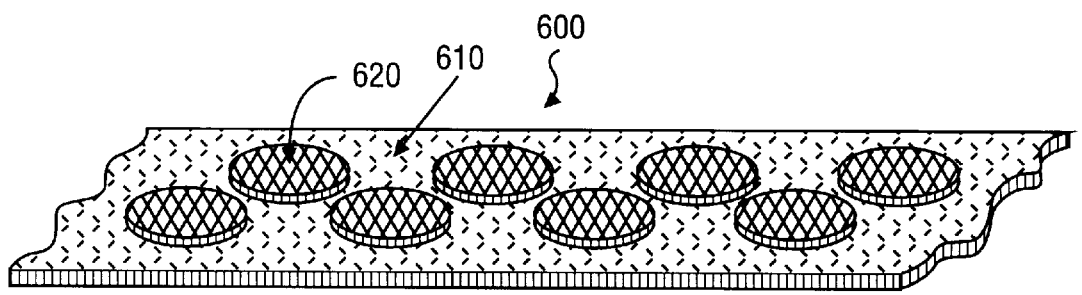

FIG. 5 illustrates a perspective view of a set of tabs formed according to the present invention from the cavities of the wide appliqué strip of FIG. 4 to provide an enhanced gripping surface. Thus, in an embodiment wherein cavities 410 are die-cut from wide strip 400, the portions of wide strip 400 that are cut away are used to form spots 410. Then, effective gripping surfaces are created by affixing a pattern of a series of smaller spots 510 (or, alternately, other geometric shapes) that are made of the antislip material. The pattern of the spots 510 is formed such that the shapes are separated by sufficient distance to provide multiple edges and textured surfaces thereby allowing the flesh to conform over multiple edges and surfaces to provide antislip characteristics beyond that of a single strip.

Figure 7:
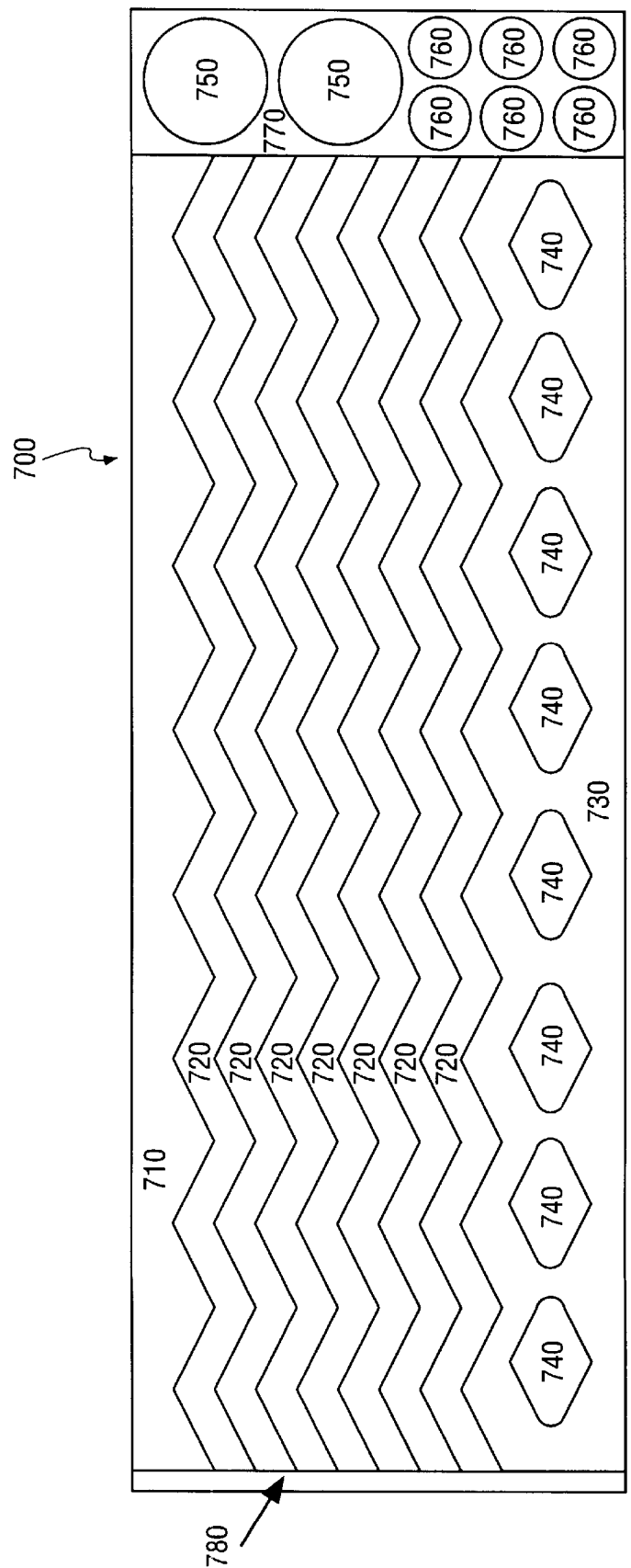
FIG. 7 illustrates a top view of a zig-zag cutting diagram for an appliqué set constructed according to the present invention.

FIG. 7 illustrates a top view of a zig-zag cutting diagram for an appliqué set constructed according to the present invention. In FIG. 7, a single wide strip of appliqué 700 is die-cut into several different shaped tabs 710, 720, 730, 740, 750, 760 and 780 that can be affixed to a portable computer.

FIG. 8 illustrates a front view of a portable computer that has had appliqués from the zig-zag set of FIG. 7 affixed according to the present invention to provide an enhanced gripping surface. In FIG. 8, zig-zag strips 720 are affixed to one edge of the front surface of dam-shell portable computer 800. Tabs 740 are affixed to the opposite edge of the front surface 800.

FIG. 9 illustrates a back view of a portable computer that has had appliqués from the zig-zag set of FIG. 7 affixed according to the present invention to provide an enhanced gripping surface. In FIG. 9, wide strip 730 has cavities and is affixed to one edge of the back surface of clam-shell portable computer 800. A zig-zag strip 720 is also affixed to computer 800 spaced apart from wide strip 730. Furthermore, wide strip 710 does not have cavities and is affixed to the opposite edge of the back surface of clam-shell portable computer 800. Another zig-zag strip 720 is affixed to computer 800 spaced apart from wide strip 710. Moreover, additional zig-zag strips 720 are affixed along the side edges of the back surface of computer 800.

FIG. 10 illustrates a side view of a portable computer that has had appliqués from the zig-zag set of FIG. 7 affixed according to the present invention to provide an enhanced gripping surface. Note that computer 800 can be grasped by the hand so that the thumb conforms to the gap between tabs 720 and 730 and the fingers conform to the gaps formed between tabs 720. Alternately, computer 800 can be grasped by the hand so that the fingers conform to the gap between tabs 720 and 730 and the thumb conforms to the gaps formed between tabs 720.

Furthermore, computer 800 can be grasped by the hand at the opposite end of computer 800 so that the thumb conforms to the gap between tabs 710 and 720 and the fingers conform to the gaps formed between tabs 740. Alternately, computer 800 can be grasped by the hand so that the fingers conform to the gap between tabs 710 and 720 and the thumb conforms to the gaps formed between tabs 730.

Also note that the tabs are affixed to computer 800 in regions of the exterior surface of computer 800 in a manner that does not obstruct the clam-shell pivot thereby permitting computer 800 to be opened easily for use.

Figure 11:
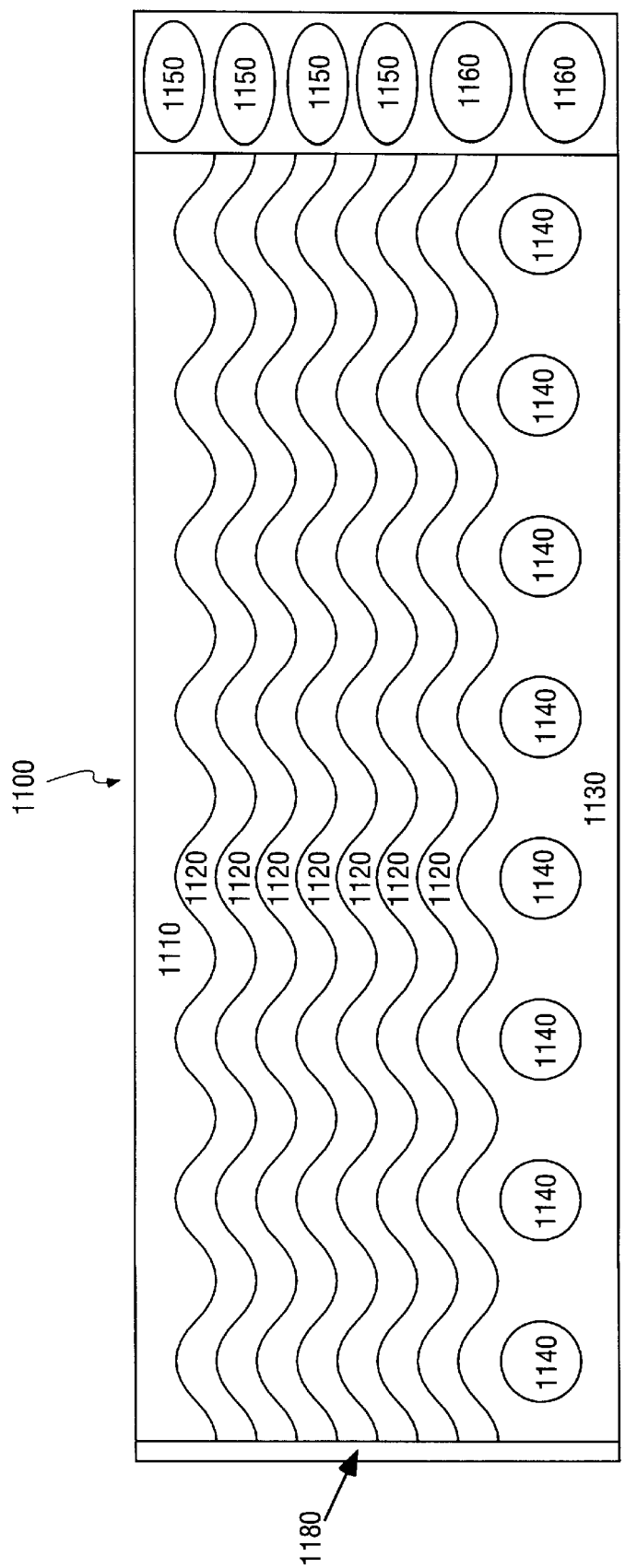
FIG. 11 illustrates a top view of a wave-shaped cutting diagram for an appliqué set constructed according to the present invention.

FIG. 11 illustrates a top view of a wave patterned cutting diagram for an appliqué set constructed according to the present invention. In FIG. 11, a single wide strip of appliqué 1100 is die-cut into several different shaped tabs 1110, 1120, 1130, 1140, 1150, 1160 and 1180 that can be affixed to a portable computer.

FIG. 12 illustrates a front view of a portable computer that has had appliqués from the wave set of FIG. 11 affixed according to the present invention to provide an enhanced gripping surface. In FIG. 12, wave shaped strips 1120 are affixed to one edge of the front surface of clam-shell portable computer 800. A tab 1140 is affixed to the edge of the front surface of clam-shell portable computer 800 a small distance from wave strips 1120. Additional tabs 1140 are affixed to the opposite edge of the front surface 800. Note that the rounded edges of the wave shaped strips 1120 are less likely than the zig-zag strips 720 of FIG. 7 to provide pointed regions that can facilitate the peeling off of the strips once they have been attached.

FIG. 13 illustrates a back view of a portable computer that has had appliqués from the wave set of FIG. 11 affixed according to the present invention to provide an enhanced gripping surface. In FIG. 13, wide strip 1130 has cavities and is affixed to one edge of the back surface of clam-shell portable computer 800. A wave shaped strip 1120 is also affixed to computer 800 spaced apart from wide strip 1130. Furthermore, wide strip 1110 does not have cavities and is affixed to the opposite edge of the back surface of clam-shell portable computer 800. Another wave-shaped strip 1120 is affixed to computer 800 spaced apart from wide strip 1110. Moreover, additional wave-shaped strips 1120 are affixed along the side edges of the back surface of computer 800.

The present invention can be practiced over a wide range of appliqué shapes. The following FIGS. 14 to 33 illustrate alternate embodiments of the present invention. It is to be understood that, rather than presenting an exhaustive list of all possible embodiments of the present invention, the following figures merely present several examples to demonstrate the diversity of appliqué shapes that can be employed.

Figure 14:
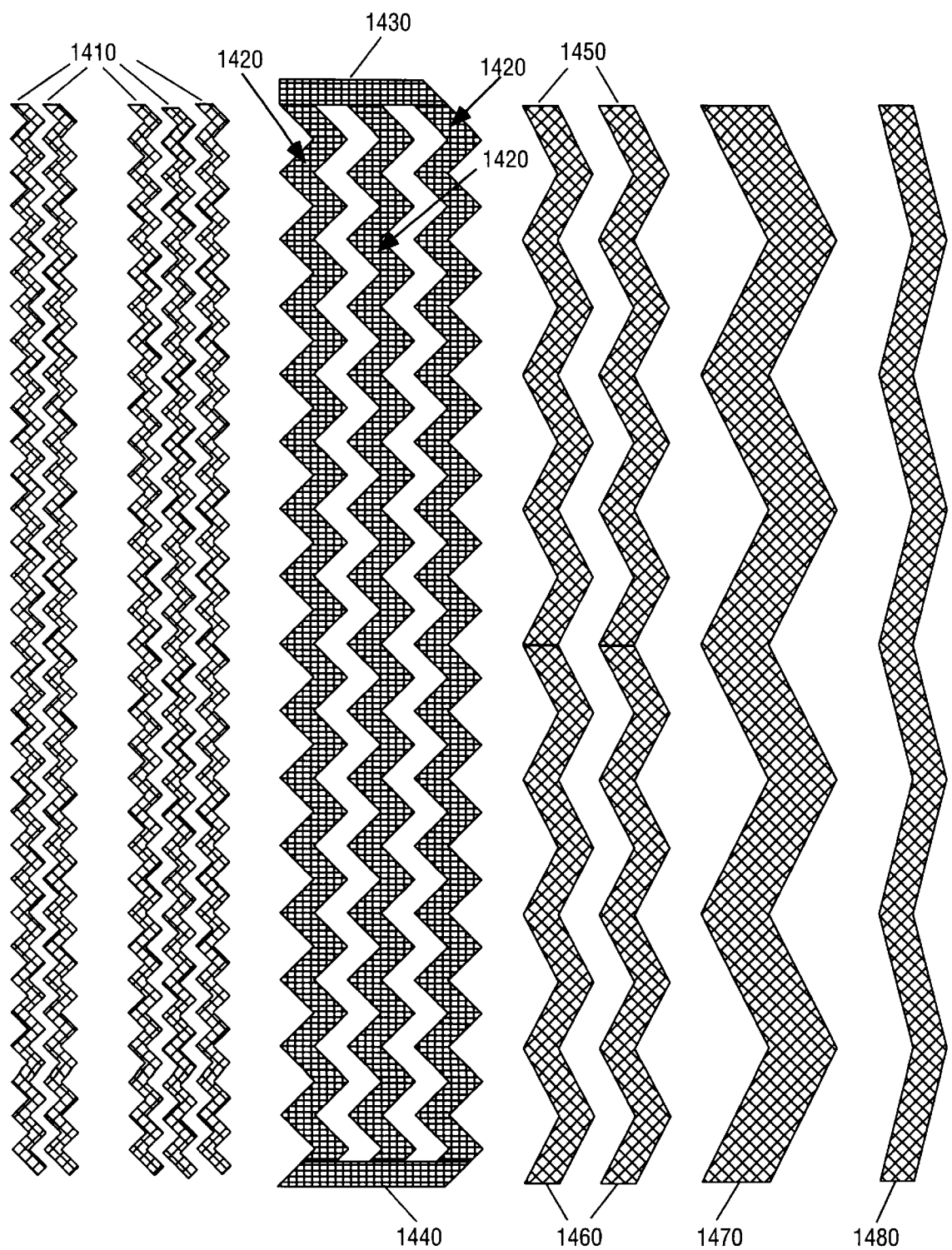
FIG. 14 illustrates additional zig-zag patterned appliqués.

FIG. 14 illustrates additional zig-zag patterned appliqués. In FIG. 14 it can be seen that the width of the zig-zag strips can vary over a wide range. For example, zig-zag strip 1470 is significantly wider than zig-zag strips 1410. Zig-zag strips 1420, 1450, 1460 and 1480 have a width falling between those of strips 1410 and 1470.

Furthermore, it can be seen in FIG. 14 that the pitch angle of the zig-zag strips can vary over a wide range. For example, the pitch angle of zig-zag strip 1480 is significantly more obtuse than that of zig-zag strips 1410 or 1420. Zig-zag strips 1450, 1460 and 1470 have a pitch angle falling between those of strips 1410 and 1480.

Note that short strips can be formed from a long strip as is the case of strips 1450 and 1460. Further note that straight tabs can also be formed. This is illustrated in the case of end strips 1430 and 1440, which are placed at the ends of zig-zag strips 1420.

Figure 15:
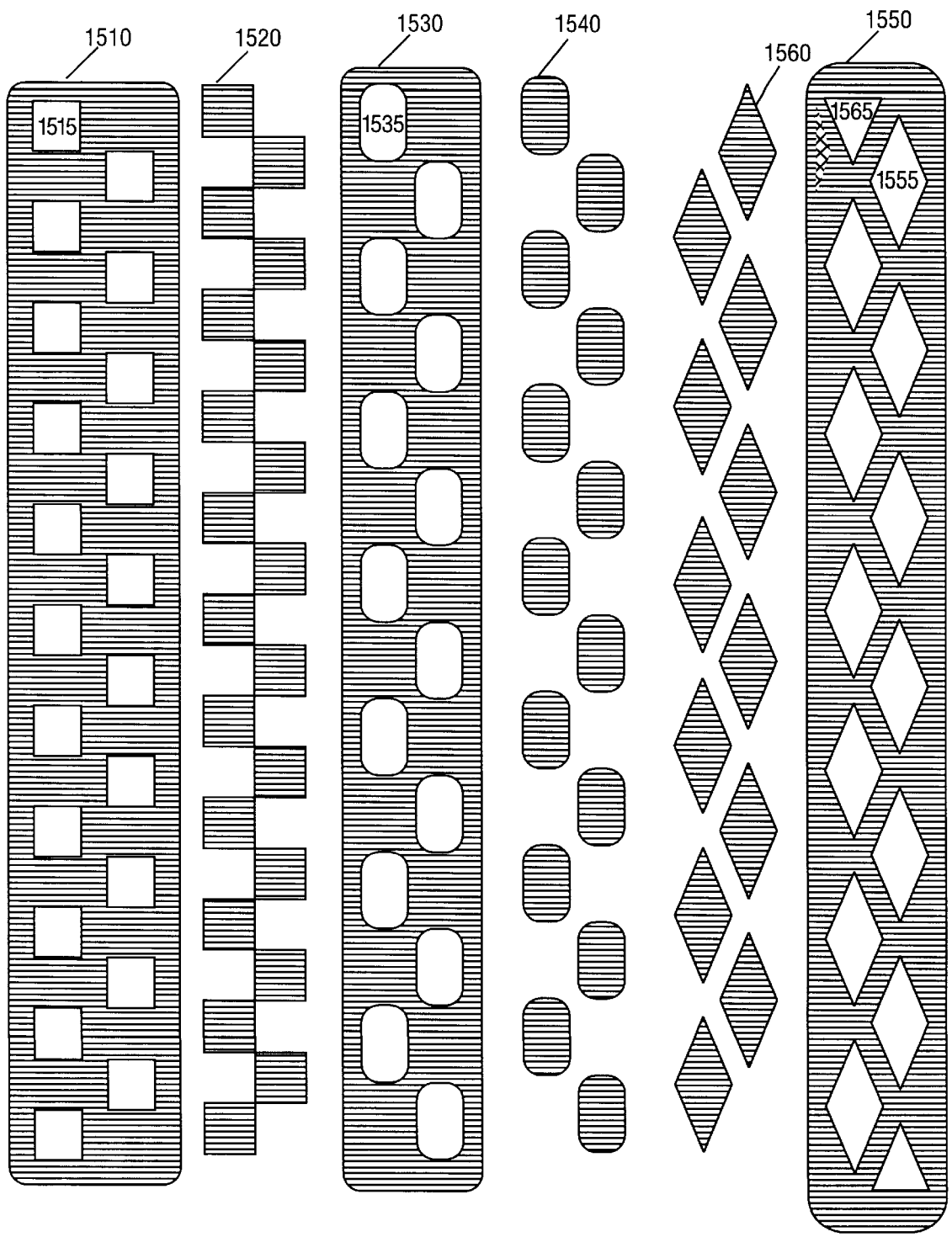
FIG. 15 illustrates square, rounded rectangle and diamond patterned appliqués.

FIG. 15 illustrates square, rounded rectangle and diamond patterned appliqués. In FIG. 15, strip 1510 has two rows of offset square cavities 1515 formed according to the present invention to provide an enhanced gripping surface. Thus, additional edges are incorporated into wider strip 1510 by making cut outs 1515 of sufficient size to permit the flesh to conform to the cavities 1515 and to grab the edges of the cavities 1515.

Furthermore, in an embodiment wherein cavities 1515 are die-cut from wide strip 1510, the portions of wide strip 1510 that are cut away are used to form squares 1520. Then, in one embodiment, additional effective gripping surfaces are created by affixing a pattern of squares 1520 as shown in FIG. 15 that are made of the antislip material. The pattern of the squares 1520 is formed such that the shapes provide multiple edges and textured surfaces thereby allowing the flesh to conform over multiple edges and surfaces to provide antislip characteristics beyond that of a single strip.

Similarly, in FIG. 15, strip 1530 has two rows of offset rounded square cavities 1535 formed according to the present invention to provide an enhanced gripping surface. Thus, additional edges are incorporated into wider strip 1530 by making cut outs 1535 of sufficient size to permit the flesh to conform to the cavities 1535 and to grab the edges of the cavities 1535.

Furthermore, in an embodiment wherein cavities 1535 are die-cut from wide strip 1530, the portions of wide strip 1530 that are cut away are used to form rounded squares 1540. Then, in one embodiment, additional effective gripping surfaces are created by affixing a pattern of squares 1540 as shown in FIG. 15 that are made of the antislip material. The pattern of the squares 1540 is formed such that the shapes provide multiple edges and textured surfaces thereby allowing the flesh to conform over multiple edges and surfaces to provide antislip characteristics beyond that of a single strip. In contrast to squares 1520, because rounded squares 1540 have rounded corners, there are no pointed regions that can provide potential areas wherein they can easily be pried away from the surface to which the have been attached.

FIG. 15 also illustrates diamond patterned appliqués. In FIG. 15, strip 1560 has two rows of offset diamond cavities 1555 formed according to the present invention to provide an enhanced gripping surface. Strip 1550 also has two half-diamond or triangular cavities 1565. Thus, additional edges are incorporated into wider strip 1550 by making cut outs 1555 and 1565 of sufficient size to permit the flesh to conform to the cavities 1555 and 1565 and to grab the edges of the cavities 1555 and 1565.

Furthermore, in an embodiment wherein cavities 1565 are die-cut from wide strip 1550, the portions of wide strip 1550 that are cut away are used to form diamonds 1560. Then, in one embodiment, additional effective gripping surfaces are created by affixing a pattern of diamonds 1560 as shown in FIG. 15 that are made of the antislip material. The pattern of the diamonds 1560 is formed such that the shapes provide multiple edges and textured surfaces thereby allowing the flesh to conform over multiple edges and surfaces to provide antislip characteristics beyond that of a single strip.

Figure 16:
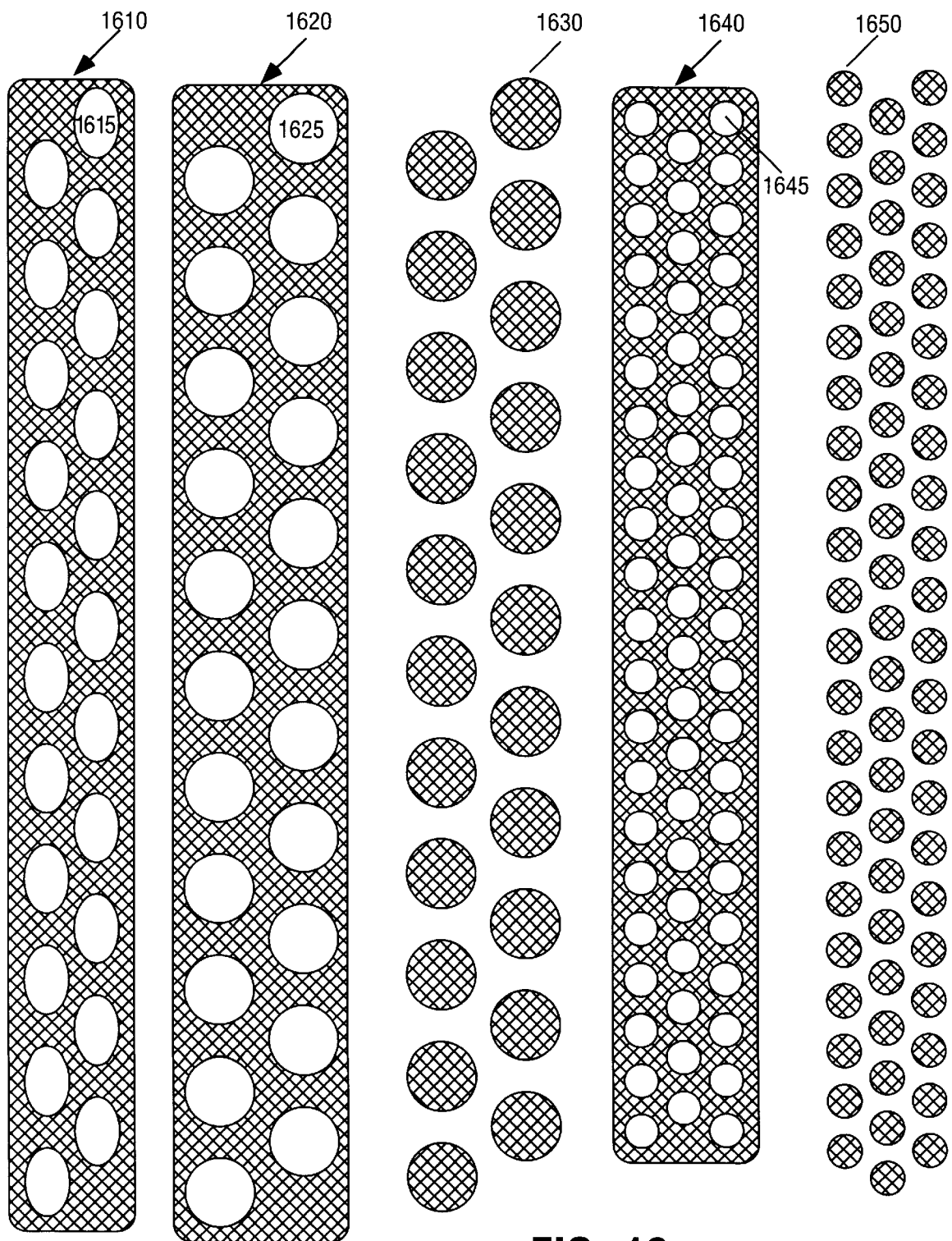
FIG. 16 illustrates circle patterned appliqués.

FIG. 16 illustrates circle patterned appliqués. In FIG. 16, strip 1620 has two rows of offset circle cavities 1625 formed according to the present invention to provide an enhanced gripping surface. Thus, additional edges are incorporated into wider strip 1620 by making cut outs 1625 of sufficient size to permit the flesh to conform to the cavities 1625 and to grab the edges of the cavities 1625.

Furthermore, in an embodiment wherein cavities 1625 are die-cut from wide strip 1620, the portions of wide strip 1620 that are cut away are used to form circles 1630. Then, in one embodiment, additional effective gripping surfaces are created by affixing a pattern of circles 1630 as shown in FIG. 16 that are made of the antislip material. The pattern of the circles 1630 is formed such that the shapes provide multiple edges and textured surfaces thereby allowing the flesh to conform over multiple edges and surfaces to provide antislip characteristics beyond that of a single strip.

In FIG. 16, an alternate embodiment is shown wherein strip 1610 has two rows of offset oval cavities 1615 formed according to the present invention to provide an enhanced gripping surface. Thus, additional edges are incorporated into wider strip 1610 by making cut outs 1615 of sufficient size to permit the flesh to conform to the cavities 1615 and to grab the edges of the cavities 1615.

FIG. 16 illustrates another alternate embodiment of circle patterned appliqués. In FIG. 16, strip 1640 has three rows of offset small circle cavities 1645 formed according to the present invention to provide an enhanced gripping surface. Thus, additional edges are incorporated into wider strip 1640 by making cut outs 1645 of sufficient size to permit the flesh to conform to the cavities 1645 and to grab the edges of the cavities 1645.

Furthermore, in an embodiment wherein cavities 1645 are die-cut from wide strip 1640, the portions of wide strip 1640 that are cut away are used to form circles 1650. Then, in one embodiment, additional effective gripping surfaces are created by affixing a pattern of circles 1650 as shown in FIG. 16 that are made of the antislip material. The pattern of the circles 1650 is formed such that the shapes provide multiple edges and textured surfaces thereby allowing the flesh to conform over multiple edges and surfaces to provide antislip characteristics beyond that of a single strip.

Figure 17:
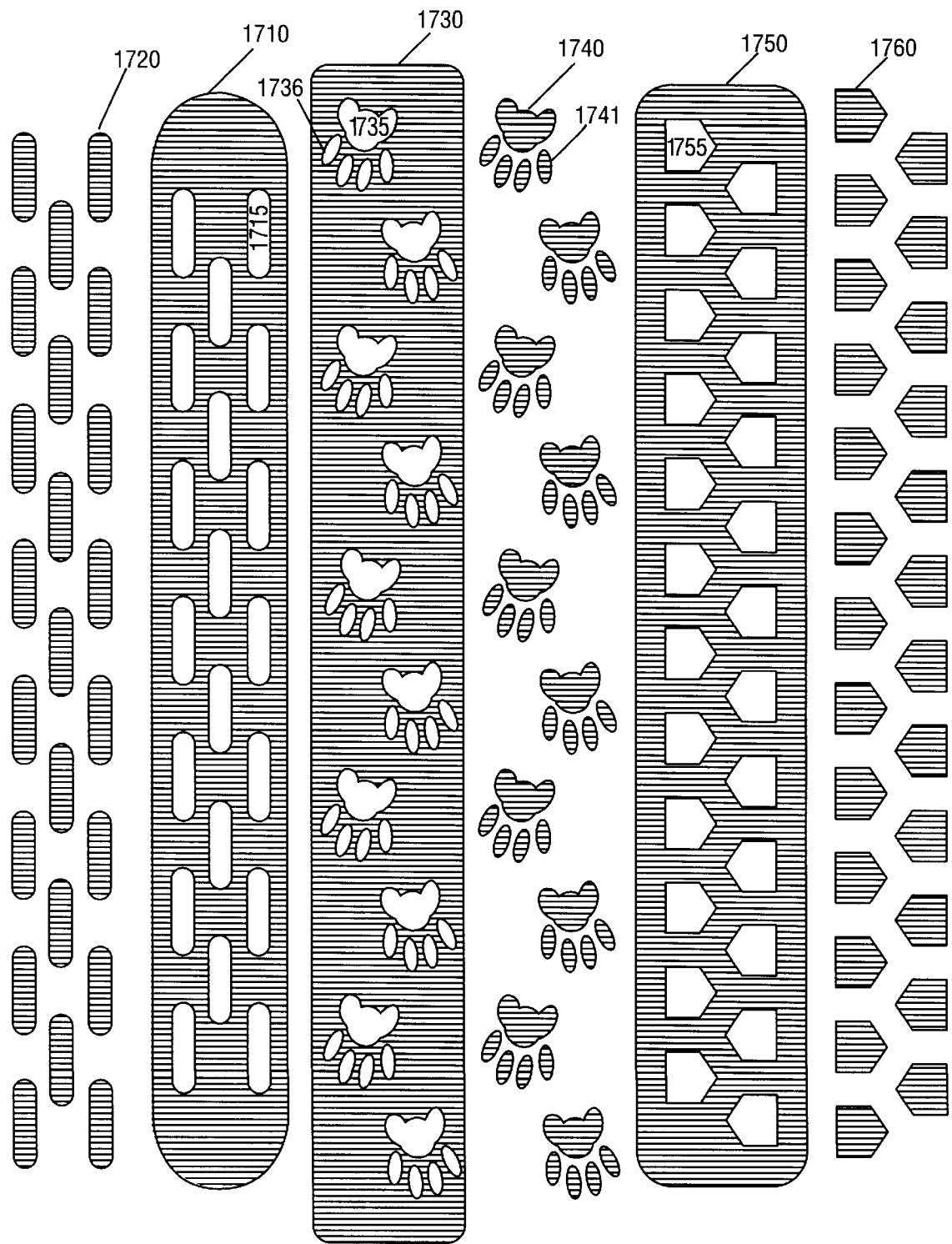
FIG. 17 illustrates rounded rectangle, paw print and home plate patterned appliqués.

FIG. 17 illustrates rounded rectangle, paw print and home plate patterned appliqués. In FIG. 17, strip 1710 has two rows of offset rounded rectangle cavities 1715 formed according to the present invention to provide an enhanced gripping surface. Thus, additional edges are incorporated into wider strip 1710 by making cut outs 1715 of sufficient size to permit the flesh to conform to the cavities 1715 and to grab the edges of the cavities 1715.

Furthermore, in an embodiment wherein cavities 1715 are die-cut from wide strip 1710, the portions of wide strip 1710 that are cut away are used to form rounded rectangles 1720. Then, in one embodiment, additional effective gripping surfaces are created by affixing a pattern of rounded rectangles 1720 as shown in FIG. 17 that are made of the antislip material. The pattern of the rounded rectangles 1720 is formed such that the shapes provide multiple edges and textured surfaces thereby allowing the flesh to conform over multiple edges and surfaces to provide antislip characteristics beyond that of a single strip.

Similarly, in FIG. 17, strip 1730 has two rows of offset paw print cavities 1735 and 1736 formed according to the present invention to provide an enhanced gripping surface. Thus, additional edges are incorporated into wider strip 1730 by making cut outs 1735 and 1736 of sufficient size to permit the flesh to conform to the cavities 1735 and 1736 and to grab the edges of the cavities 1735 and 1736.

Furthermore, in an embodiment wherein cavities 1735 and 1736 are die-cut from wide strip 1730, the portions of wide strip 1730 that are cut away are used to form paw prints 1740 and 1741. Then, in one embodiment, additional effective gripping surfaces are created by affixing a pattern of paw prints 1740 and 1741 as shown in FIG. 17 that are made of the antislip material. The pattern of the paw prints 1740 and 1741 is formed such that the shapes provide multiple edges and textured surfaces thereby allowing the flesh to conform over multiple edges and surfaces to provide antislip characteristics beyond that of a single strip.

FIG. 17 also illustrates home plate patterned appliqués. In FIG. 17, strip 1750 has two rows of offset home plate cavities 1755 formed according to the present invention to provide an enhanced gripping surface. Thus, additional edges are incorporated into wider strip 1750 by making cut outs 1755 of sufficient size to permit the flesh to conform to the cavities 1755 and to grab the edges of the cavities 1755.

Furthermore, in an embodiment wherein cavities 1755 are die-cut from wide strip 1750, the portions of wide strip 1750 that are cut away are used to form home plate tabs 1760. Then, in one embodiment, additional effective gripping surfaces are created by affixing a pattern of tabs 1760 as shown in FIG. 17 that are made of the antislip material. The pattern of the tabs 1760 is formed such that the shapes provide multiple edges and textured surfaces thereby allowing the flesh to conform over multiple edges and surfaces to provide antislip characteristics beyond that of a single strip.

Figure 18:
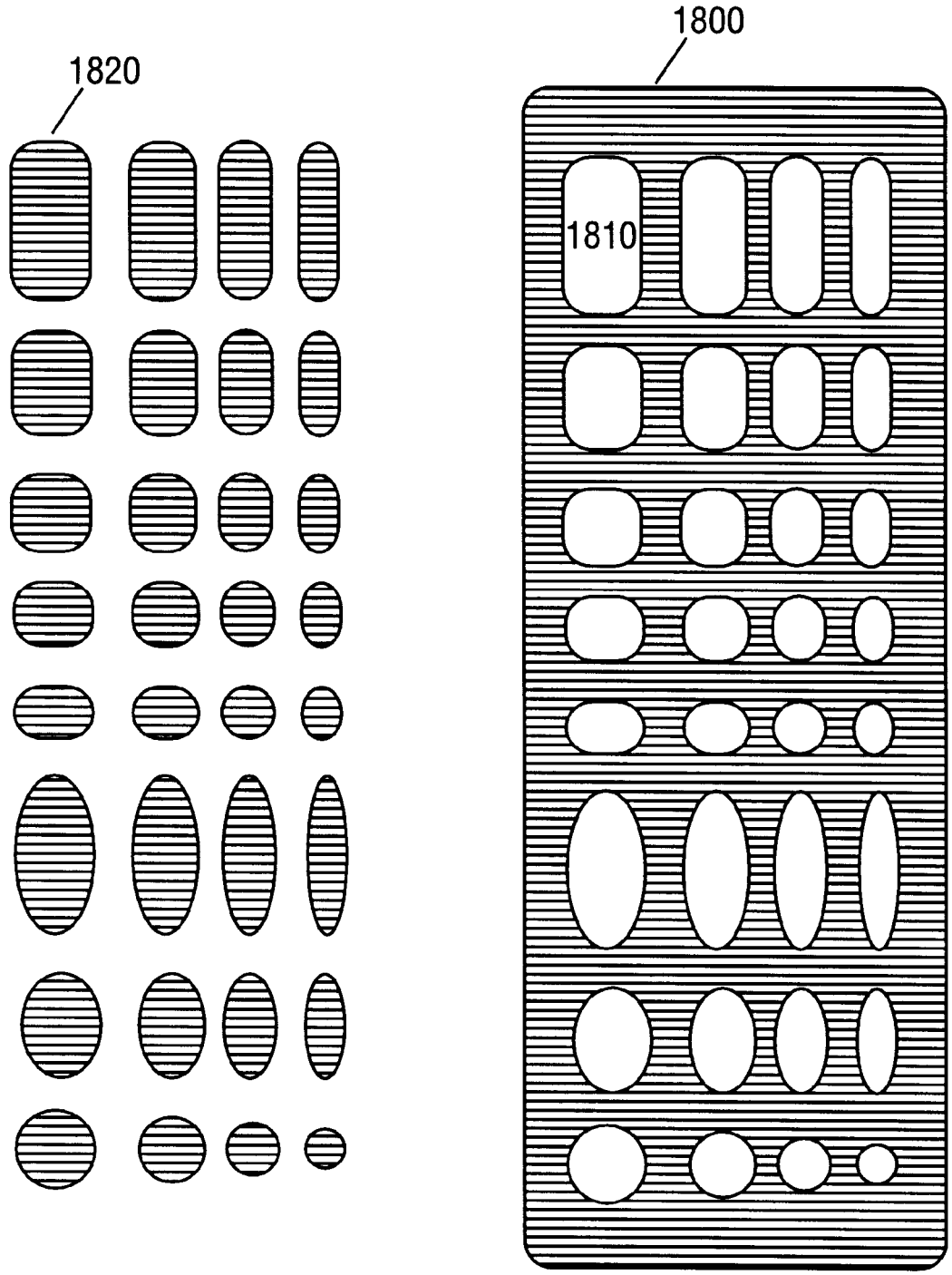
FIG. 18 illustrates oval and rounded rectangle patterned appliqués.

FIG. 18 illustrates a wide variety of potential oval and rounded rectangle patterned appliqués. In FIG. 18, strip 1800 has four rows of cavities 1810 formed according to the present invention to provide an enhanced gripping surface. Thus, additional edges are incorporated into wider strip 1800 by making cut outs 1810 of sufficient size to permit the flesh to conform to the cavities 1810 and to grab the edges of the cavities 1810.

Furthermore, in an embodiment wherein cavities 1810 are die-cut from wide strip 1800, the portions of wide strip 1800 that are cut away are used to form tabs 1820. Then, in one embodiment, additional effective gripping surfaces are created by affixing a pattern of tabs 1820 as shown in FIG. 18 that are made of the antislip material. The pattern of the tabs 1820 is formed such that the shapes provide multiple edges and textured surfaces thereby allowing the flesh to conform over multiple edges and surfaces to provide antislip characteristics beyond that of a single strip.

Figure 19:
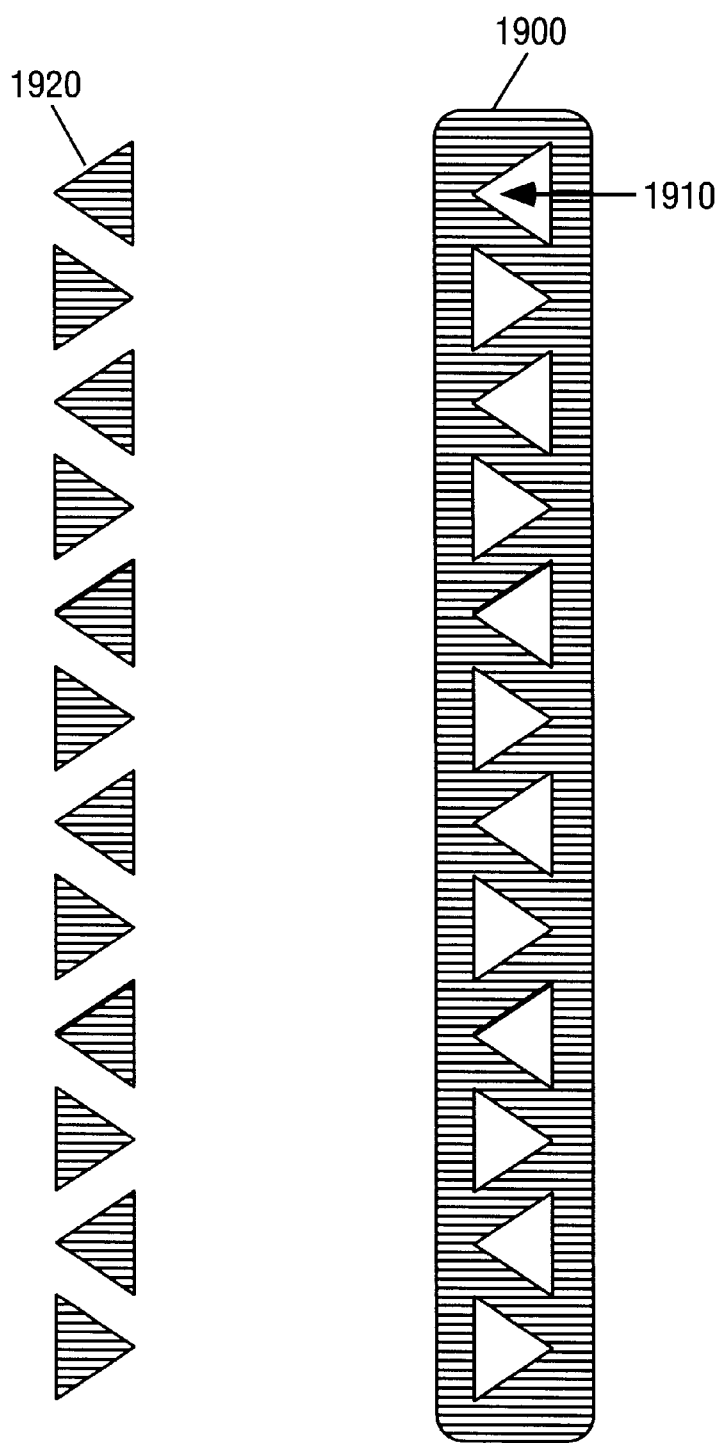
FIG. 19 illustrates triangle patterned appliqués.

FIG. 19 illustrates triangle patterned appliqués. In FIG. 19, strip 1900 has one row of triangular cavities 1910 formed according to the present invention to provide an enhanced gripping surface. Thus, additional edges are incorporated into wider strip 1900 by making cut outs 1910 of sufficient size to permit the flesh to conform to the cavities 1910 and to grab the edges of the cavities 1910.

Furthermore, in an embodiment wherein cavities 1910 are die-cut from wide strip 1900, the portions of wide strip 1900 that are cut away are used to form triangular tabs 1920. Then, in one embodiment, additional effective gripping surfaces are created by affixing a pattern of tabs 1920 as shown in FIG. 19 that are made of the antislip material. The pattern of the tabs 1920 is formed such that the shapes provide multiple edges and textured surfaces thereby allowing the flesh to conform over multiple edges and surfaces to provide antislip characteristics beyond that of a single strip.

Figure 20:
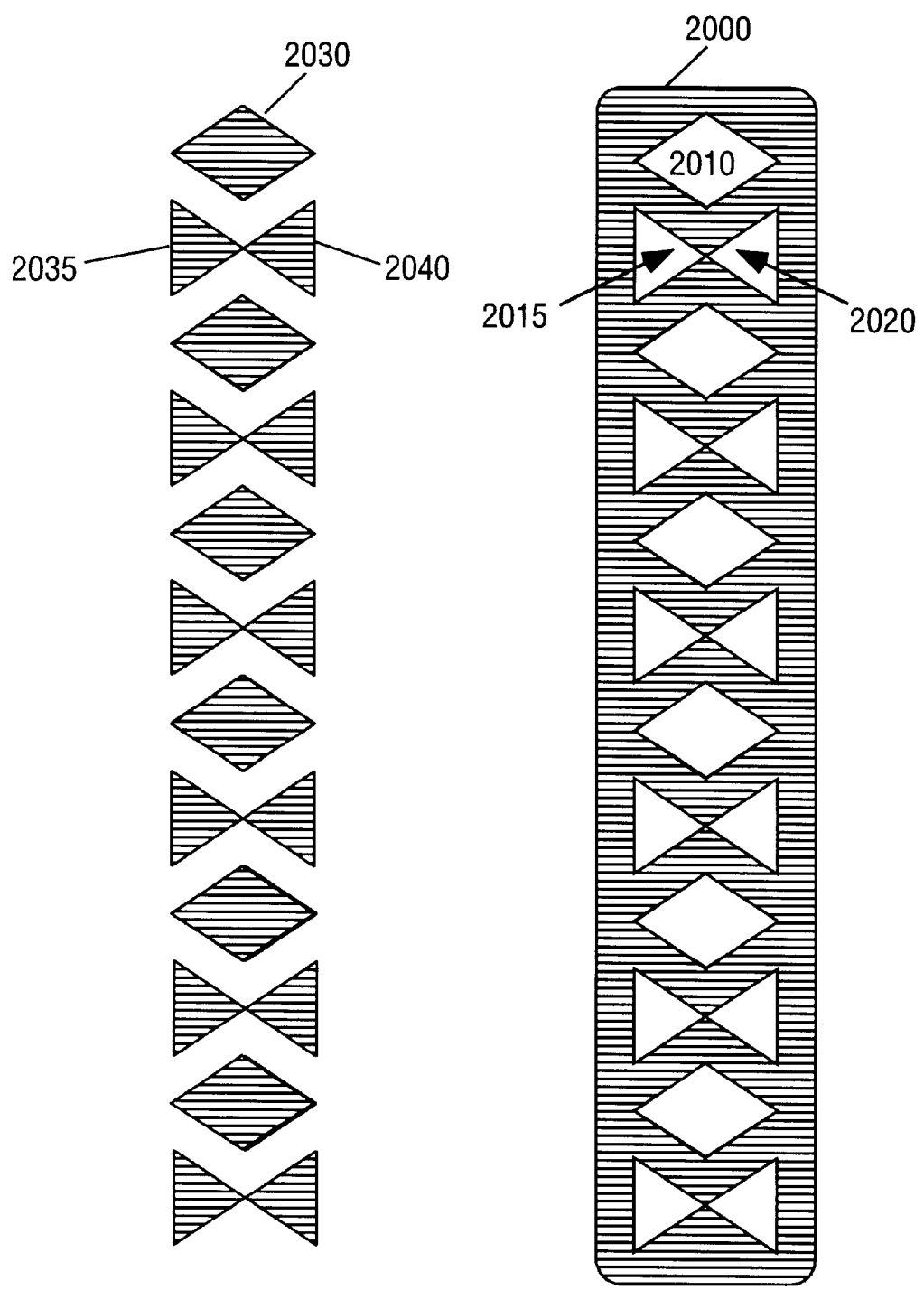
FIG. 20 illustrates diamond and bow-tie patterned appliqués.

FIG. 20 illustrates diamond and bow-tie patterned appliqués. In FIG. 20, strip 2000 has a row of diamond cavities 2010 formed alternating with bow-tie cavities formed from triangular cavities 2015 and 2020. Cavities 2010, 2015 and 2020 are formed according to the present invention to provide an enhanced gripping surface. Thus, additional edges are incorporated into wider strip 2000 by making cut outs 2010, 2015 and 2020 of sufficient size to permit the flesh to conform to the cavities 2010, 2015 and 2020 and to grab the edges of the cavities 2010, 2015 and 2020.

Furthermore, in an embodiment wherein cavities 2010, 2015 and 2020 are die-cut from wide strip 2000, the portions of wide strip 2000 that are cut away are used to form diamond tabs 2030 and to form bow-tie tabs from tabs 2035 and 2040. Then, in one embodiment, additional effective gripping surfaces are created by affixing a pattern of tabs 2030, 2035 and 2040 as shown in FIG. 20 that are made of the antislip material. The pattern of the tabs 2030, 2035 and 2040 is formed such that the shapes provide multiple edges and textured surfaces thereby allowing the flesh to conform over multiple edges and surfaces to provide antislip characteristics beyond that of a single strip.

Figure 21:
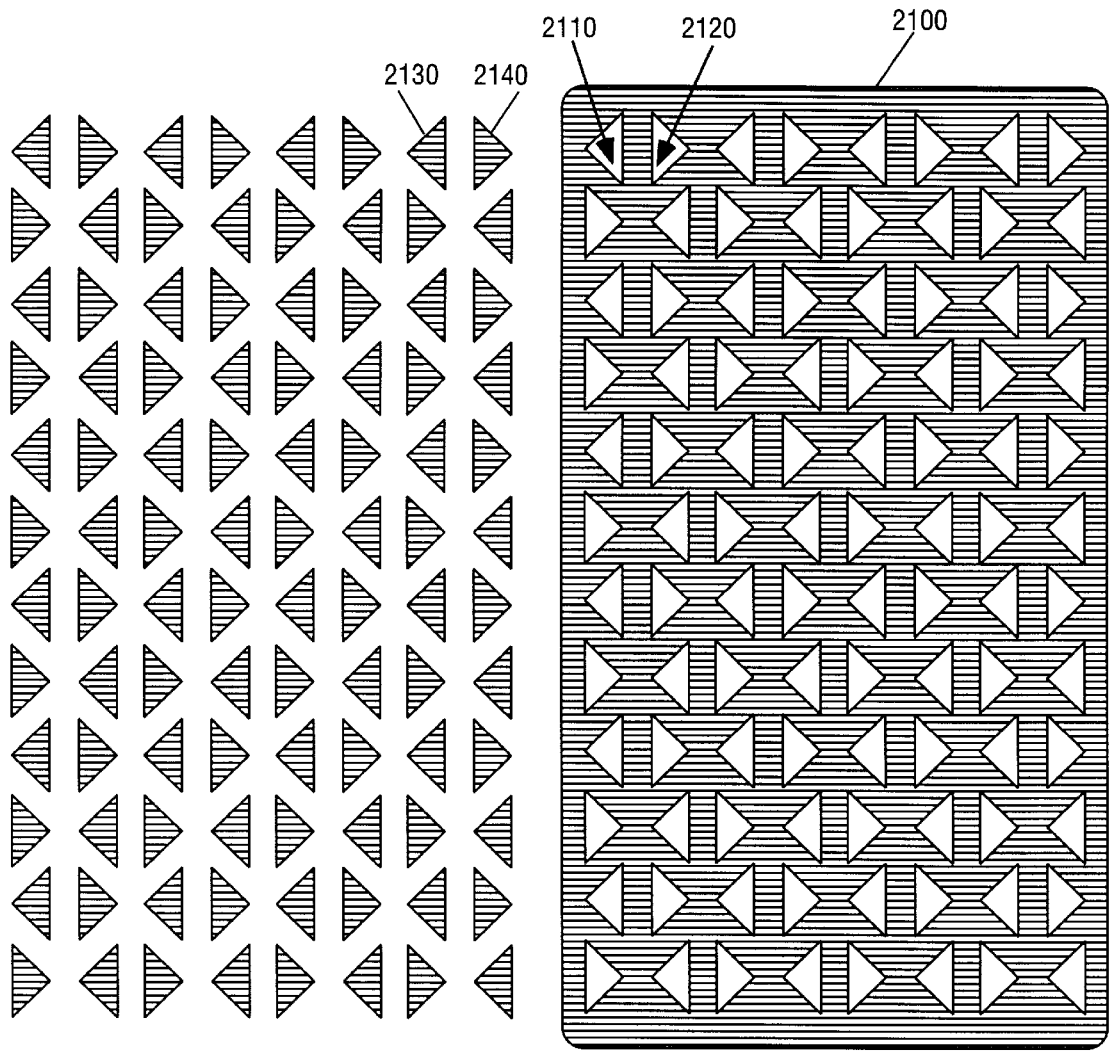
FIG. 21 illustrates triangle patterned appliqués formed from a wide strip.

FIG. 21 illustrates triangle patterned appliqués formed from a wide strip. In FIG. 21, strip 2100 has four rows of triangular cavities 2110 alternating with four rows of reversed triangular cavities 2120 formed according to the present invention to provide an enhanced gripping surface. Thus, additional edges are incorporated into wider strip 2100 by making cut outs 2110 and 2120 of sufficient size to permit the flesh to conform to the cavities 2110 and 2120 and to grab the edges of the cavities 2110 and 2120.

Furthermore, in an embodiment wherein cavities 2110 and 2120 are die-cut from wide strip 2100, the portions of wide strip 2100 that are cut away are used to form triangular tabs 2130 and reversed triangular tabs 2140. Then, in one embodiment, additional effective gripping surfaces are created by affixing a pattern of tabs 2130 and 2140 as shown in FIG. 21 that are made of the antislip material. The pattern of the tabs 2130 and 2140 is formed such that the shapes provide multiple edges and textured surfaces thereby allowing the flesh to conform over multiple edges and surfaces to provide antislip characteristics beyond that of a single strip.

Figure 22:
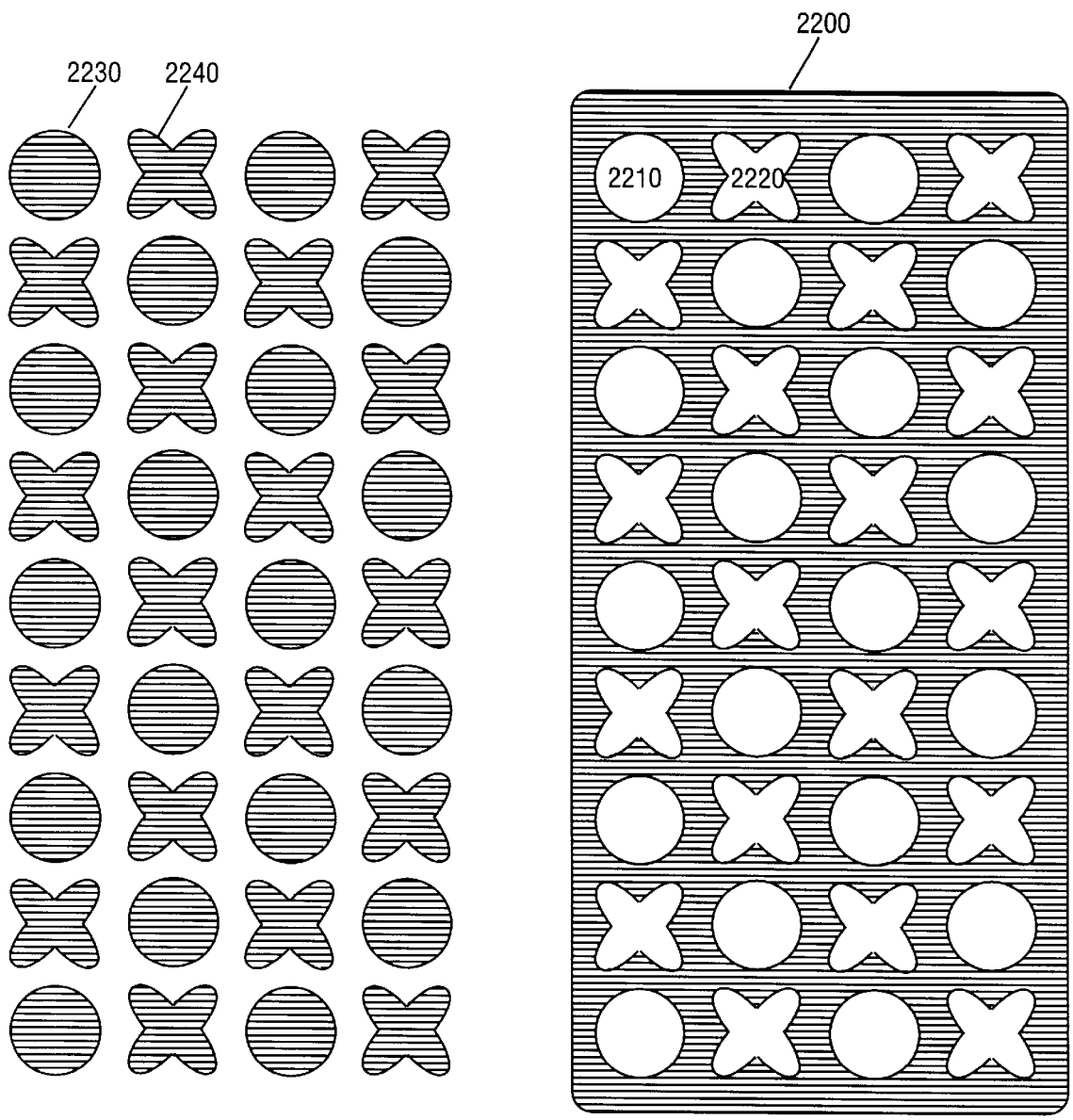
FIG. 22 illustrates circular and rounded cross patterned appliqués.

FIG. 22 illustrates circular and rounded cross patterned appliqués. In FIG. 22, strip 2200 has two rows of circular cavities 2210 alternating with two rows of rounded cross patterned cavities 2220 formed according to the present invention to provide an enhanced gripping surface. Thus, additional edges are incorporated into wider strip 2200 by making cut outs 2210 and 2220 of sufficient size to permit the flesh to conform to the cavities 2210 and 2220 and to grab the edges of the cavities 2210 and 2220.

Furthermore, in an embodiment wherein cavities 2210 and 2220 are die-cut from wide strip 2200, the portions of wide strip 2200 that are cut away are used to form circular tabs 2230 and rounded cross patterned tabs 2240. Then, in one embodiment, additional effective gripping surfaces are created by affixing a pattern of tabs 2230 and 2240 as shown in FIG. 22 that are made of the antislip material. The pattern of the tabs 2230 and 2120 is formed such that the shapes provide multiple edges and textured surfaces thereby allowing the flesh to conform over multiple edges and surfaces to provide antislip characteristics beyond that of a single strip.

Figure 23:
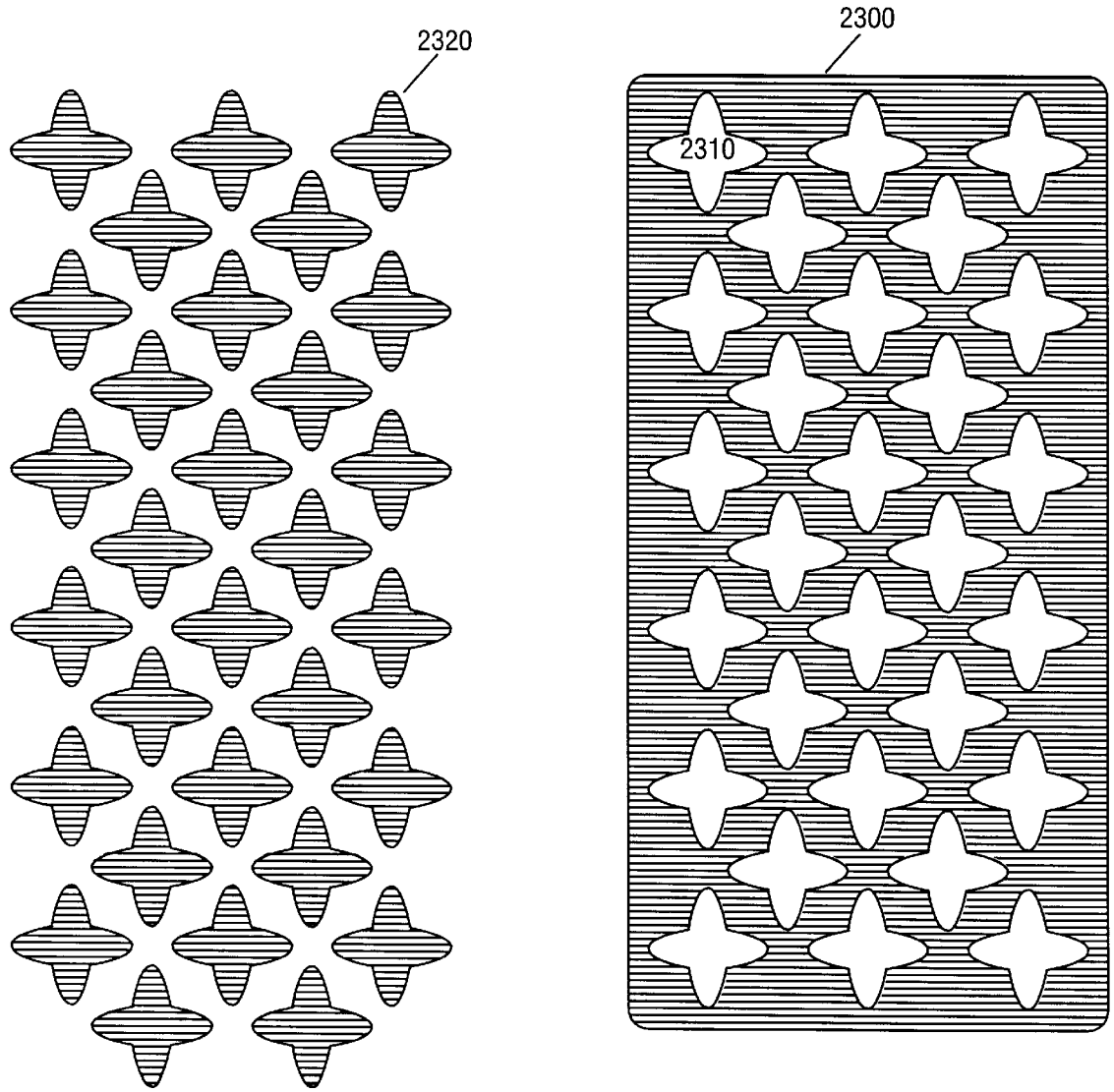
FIG. 23 illustrates rounded cross patterned appliqués.

FIG. 23 illustrates rounded cross patterned appliqués. In FIG. 23, strip 2300 has five rows of rounded cross patterned cavities 2310 formed according to the present invention to provide an enhanced gripping surface. Thus, additional edges are incorporated into wider strip 2300 by making cut outs 2310 of sufficient size to permit the flesh to conform to the cavities 2310 and to grab the edges of the cavities 2310.

Furthermore, in an embodiment wherein cavities 23210 are die-cut from wide strip 2300, the portions of wide strip 2300 that are cut away are used to form rounded cross patterned tabs 2320. Then, in one embodiment, additional effective gripping surfaces are created by affixing a pattern of tabs 2320 as shown in FIG. 23 that are made of the antislip material. The pattern of the tabs 2320 is formed such that the shapes provide multiple edges and textured surfaces thereby allowing the flesh to conform over multiple edges and surfaces to provide antislip characteristics beyond that of a single strip.

Figure 24:
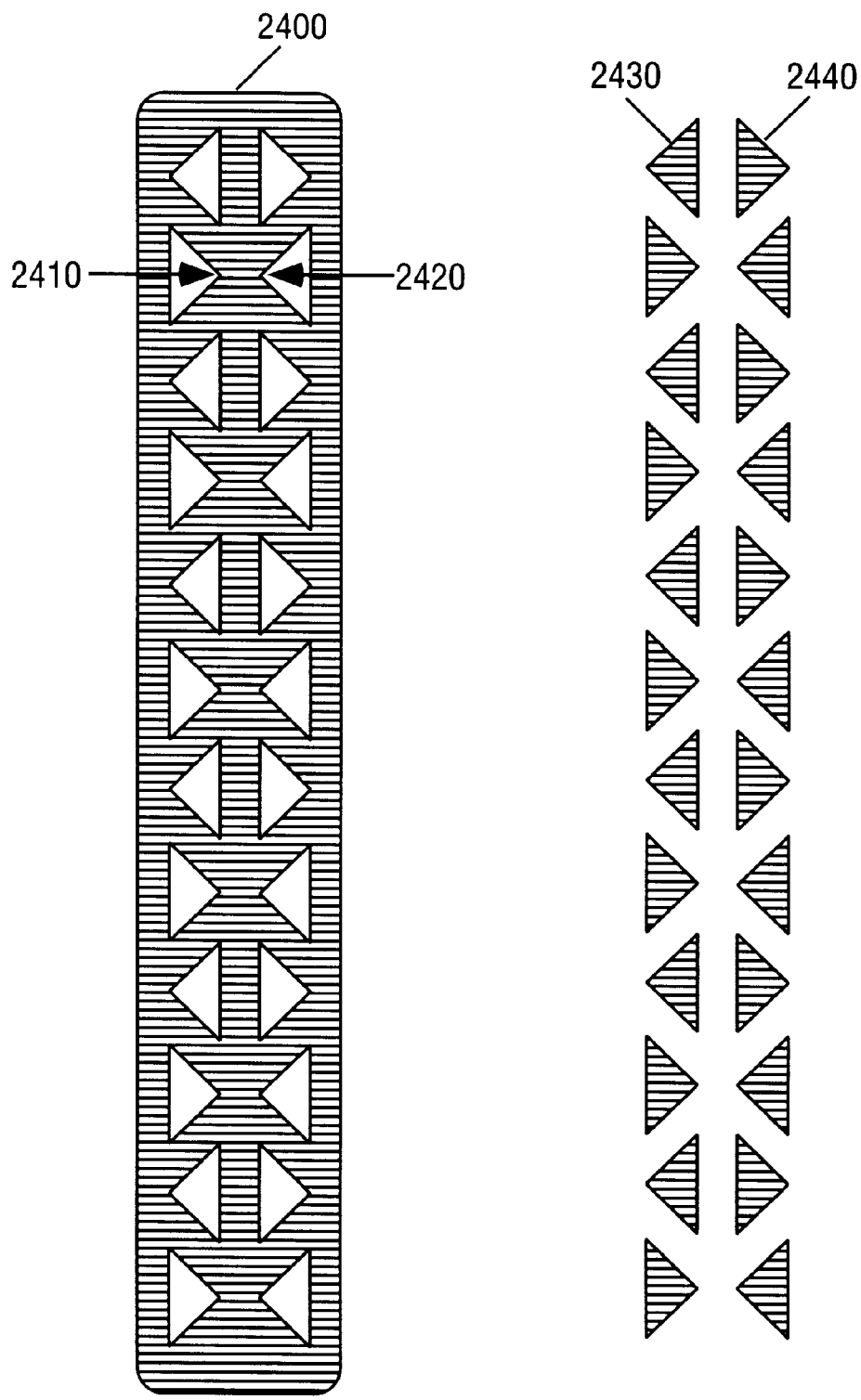
FIG. 24 illustrates triangle patterned appliqués formed from a narrow strip.

FIG. 24 illustrates triangle patterned appliqués formed from a narrow strip. In FIG. 24, narrow strip 2400 has a row of triangular cavities 2410 alternating with a row of reversed triangular cavities 2420 formed according to the present invention to provide an enhanced gripping surface. Thus, additional edges are incorporated into narrow strip 2400 by making cut outs 2410 and 2420 of sufficient size to permit the flesh to conform to the cavities 2410 and 2420 and to grab the edges of the cavities 2410 and 2420.

Furthermore, in an embodiment wherein cavities 2410 and 2420 are die-cut from narrow strip 2400, the portions of narrow strip 2400 that are cut away are used to form triangular tabs 2430 and reversed triangular tabs 2440. Then, in one embodiment, additional effective gripping surfaces are created by affixing a pattern of tabs 2430 and 2440 as shown in FIG. 24 that are made of the antislip material. The pattern of the tabs 2430 and 2440 is formed such that the shapes provide multiple edges and textured surfaces thereby allowing the flesh to conform over multiple edges and surfaces to provide antislip characteristics beyond that of a single strip.

Figure 25:
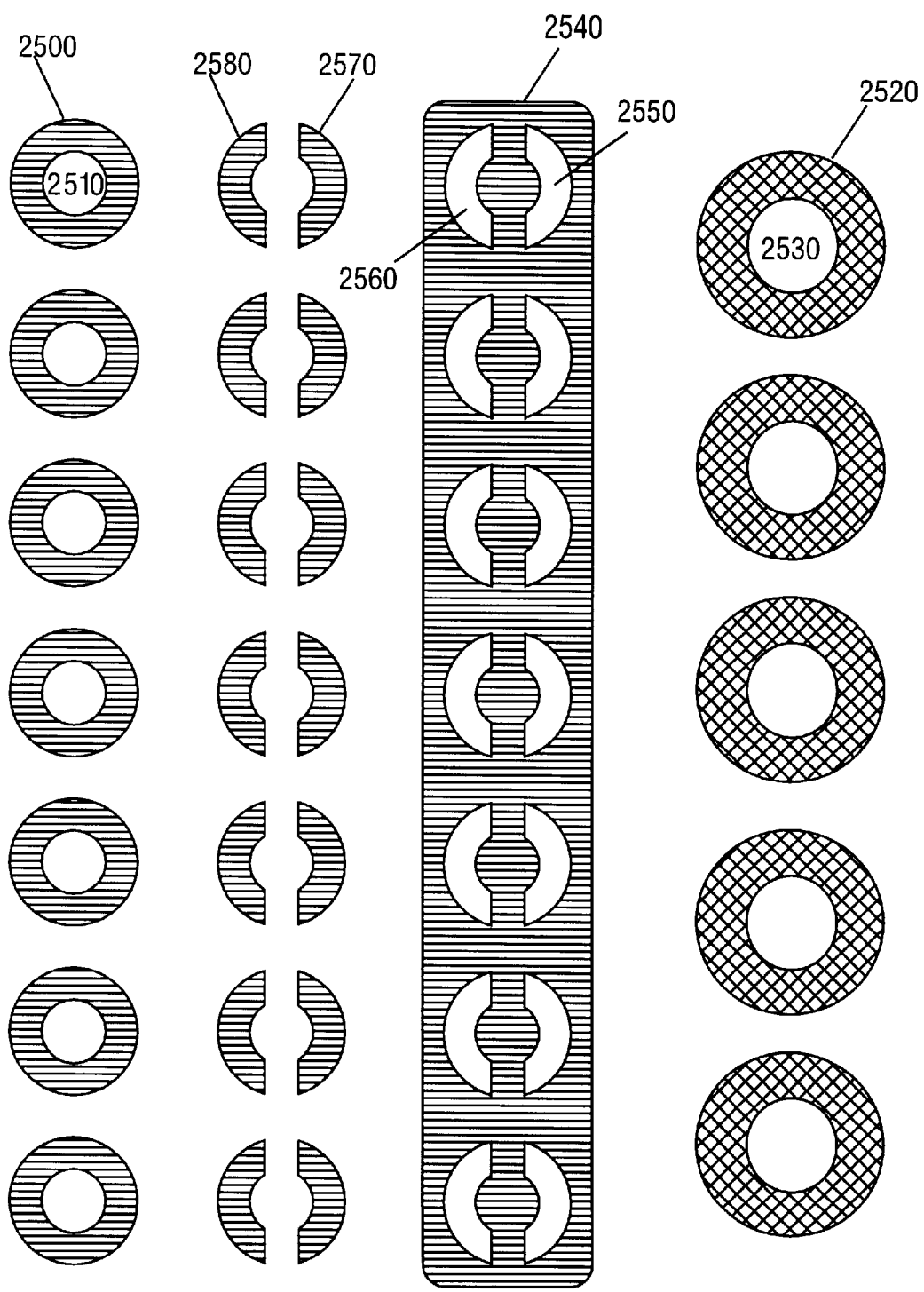
FIG. 25 illustrates torus patterned appliqués.

FIG. 25 illustrates torus patterned appliqués. In FIG. 25, strip 2540 has a row of half-torus shaped cavities 2550 alternating with a row of reversed half-torus shaped cavities 2560 formed according to the present invention to provide an enhanced gripping surface. Thus, additional edges are incorporated into wider strip 2540 by making cut outs 2550 and 2560 of sufficient size to permit the flesh to conform to the cavities 2550 and 2560 and to grab the edges of the cavities 2550 and 2560.

Furthermore, in an embodiment wherein cavities 2550 and 2560 are die-cut from wide strip 2540, the portions of wide strip 2540 that are cut away are used to form half-torus shaped tabs 2570 and reversed half-torus shaped tabs 2580. Then, in one embodiment, additional effective gripping surfaces are created by affixing a pattern of tabs 2570 and 2580 as shown in FIG. 25 that are made of the antislip material. The pattern of the tabs 2570 and 2580 is formed such that the shapes provide multiple edges and textured surfaces thereby allowing the flesh to conform over multiple edges and surfaces to provide antislip characteristics beyond that of a single strip.

Alternately, small torus tabs 2500 can be formed by cutting circular cavity 2510 from their centers. Then, in one embodiment, additional effective gripping surfaces are created by affixing a pattern of tabs 2500 as shown in FIG. 25 that are made of the antislip material. The pattern of the tabs 2500 is formed such that the shapes provide multiple edges and textured surfaces thereby allowing the flesh to conform over multiple edges and surfaces to provide antislip characteristics beyond that of a single strip.

Moreover, large torus tabs 2520 can be formed by cutting circular cavity 2530 from their centers. Then, in another embodiment, additional effective gripping surfaces are created by affixing a pattern of tabs 2520 as shown in FIG. 25 that are made of the antislip material. The pattern of the tabs 2520 is formed such that the shapes provide multiple edges and textured surfaces thereby allowing the flesh to conform over multiple edges and surfaces to provide antislip characteristics beyond that of a single strip.

Figure 26:
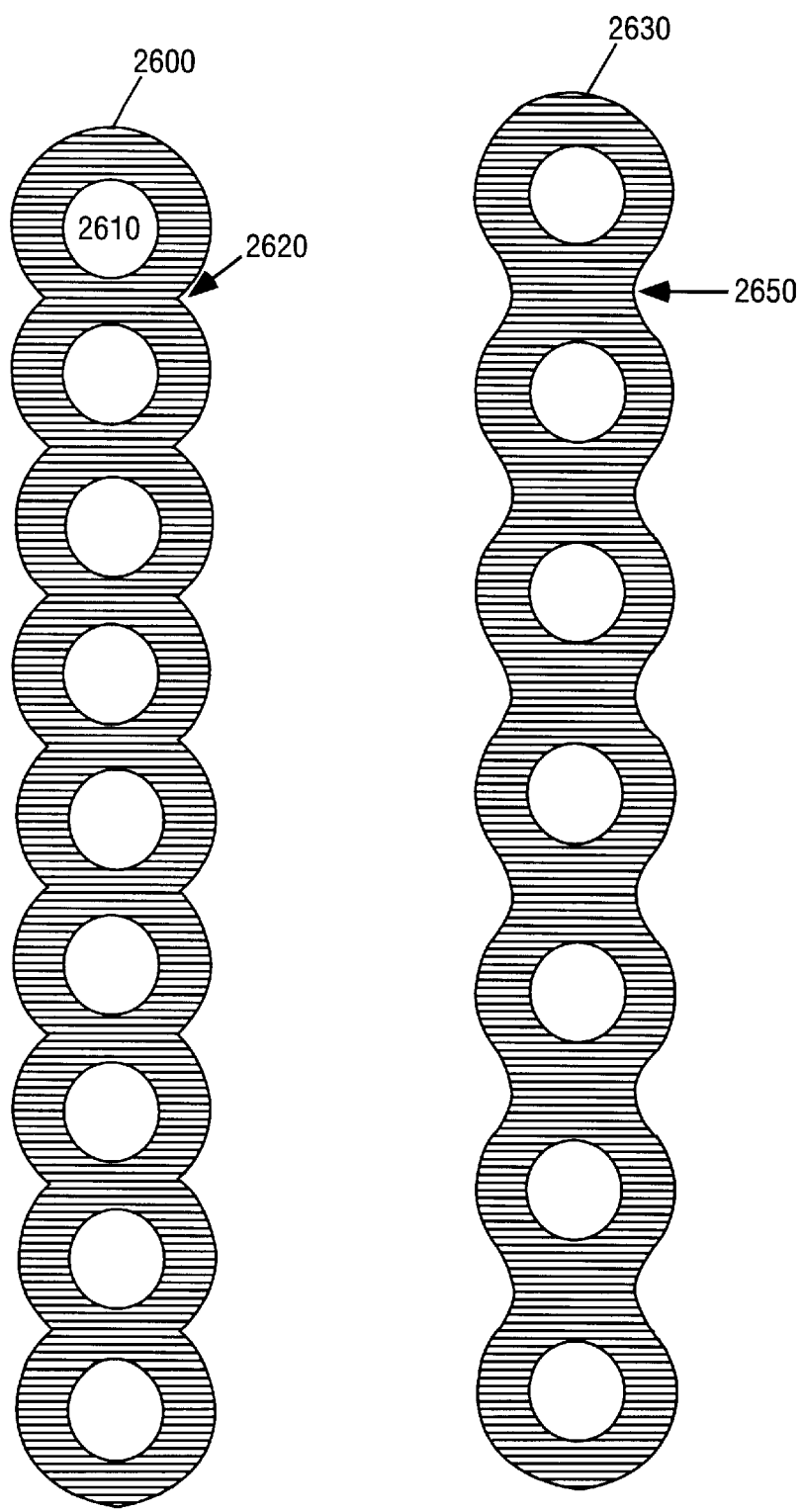
FIG. 26 illustrates helix patterned appliqués.

FIG. 26 illustrates helix patterned appliqués. In FIG. 26, strip 2600 has a row of circular cavities 2610 that create a helix patterned strip that is formed according to the present invention to provide an enhanced gripping surface. Thus, additional edges are incorporated into wider strip 2600 by making cut outs 2610 of sufficient size to permit the flesh to conform to the cavities 2610 and to grab the edges of the cavities 2610.

An alternate embodiment is also shown in FIG. 26, wherein strip 2630 has a row of circular cavities 2640 that create a helix patterned strip. Therefore, strip 2630 is also formed according to the present invention to provide an enhanced gripping surface. Thus, additional edges are incorporated into wider strip 2630 by making cut outs 2640 of sufficient size to permit the flesh to conform to the cavities 2640 and to grab the edges of the cavities 2640. Strips 2600 and 2630 are both formed, in effect, by concatenating together a series of rings. In strip 2600, junction 2620 of rings is sharp whereas in strip 2630, junction 2650 of rings is rounded.

Figure 27:
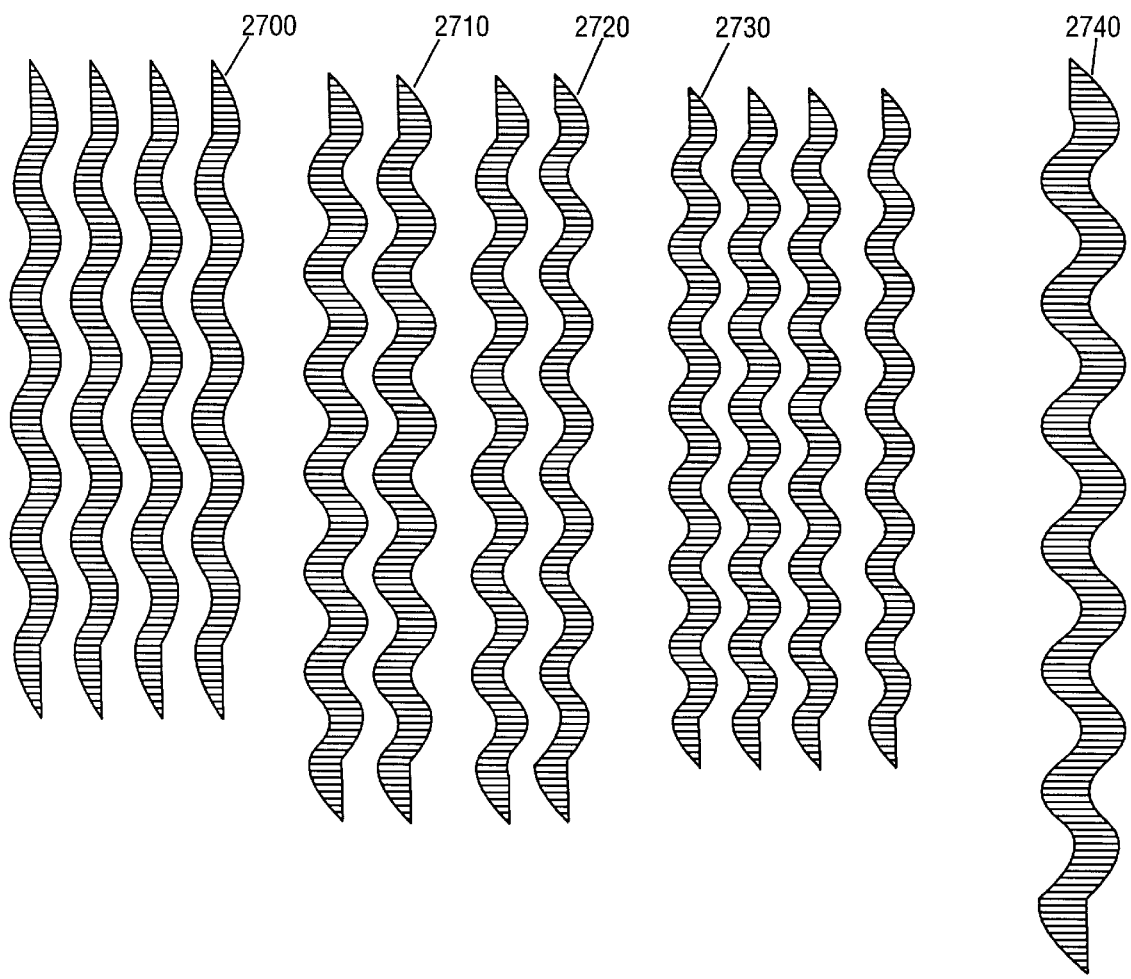
FIG. 27 illustrates serpentine patterned appliqués.

FIG. 27 illustrates serpentine patterned appliqués. In FIG. 27 it can be seen that the width of the serpentine strips can vary over a wide range. For example, serpentine strip 2740 is significantly wider than strips 2730. Serpentine strips 2700, 2710 and 2730 have a width falling between those of strips 2730 and 2740.

Furthermore, it can be seen in FIG. 27 that the wave length of the serpentine strips can vary over a wide range. For example, the wave length of each serpentine strip 2700 is significantly longer than that of each serpentine strip 2730. Moreover, the actual length of the serpentine strips can vary over a wide range. For example, serpentine strip 2740 is significantly longer than each serpentine strip 2700.

Figure 28:
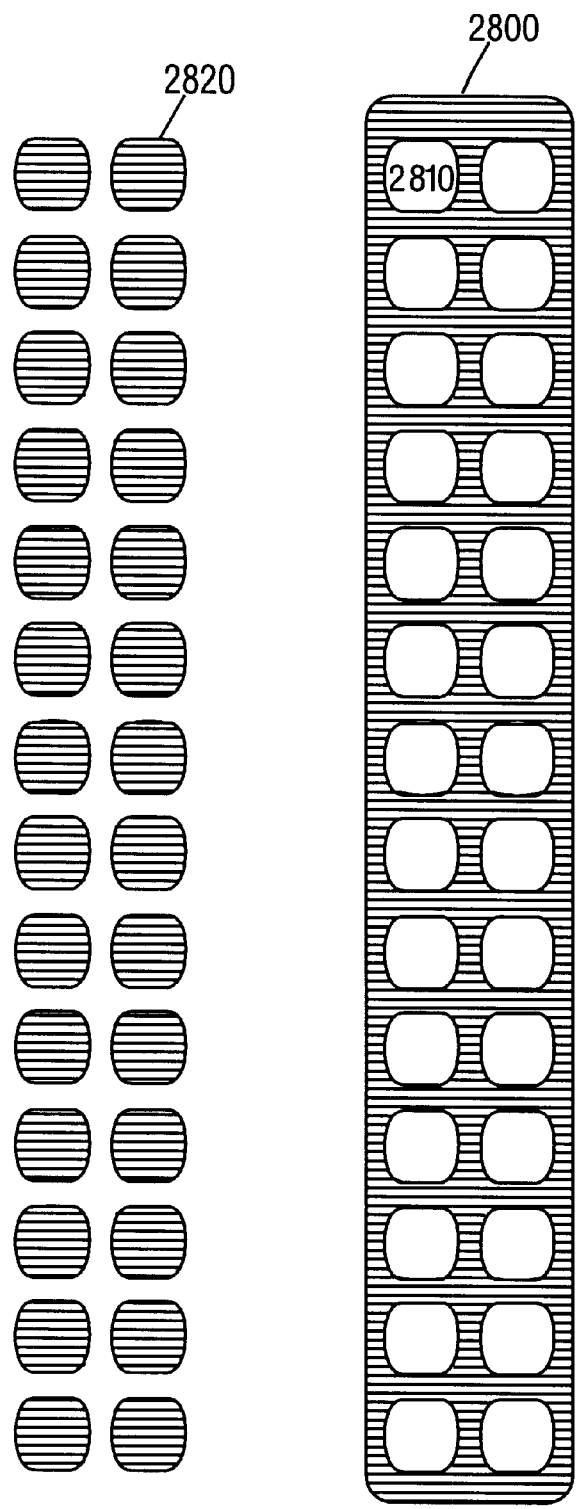
FIG. 28 illustrates rounded square patterned appliqués formed from a narrow strip.

FIG. 28 illustrates rounded square patterned appliqués formed from a narrow strip. In FIG. 28, narrow strip 2800 has two rows of rounded square cavities 2810 formed according to the present invention to provide an enhanced gripping surface. Thus, additional edges are incorporated into narrow strip 2800 by making cut outs 2810 of sufficient size to permit the flesh to conform to the cavities 2810 and to grab the edges of the cavities 2810.

Furthermore, in an embodiment wherein cavities 2810 are die-cut from narrow strip 2800, the portions of strip 2800 that are cut away are used to form rounded square tabs 2820. Then, in one embodiment, additional effective gripping surfaces are created by affixing a pattern of tabs 2820 as shown in FIG. 28 that are made of the antislip material. The pattern of the tabs 2820 is formed such that the shapes provide multiple edges and textured surfaces thereby allowing the flesh to conform over multiple edges and surfaces to provide antislip characteristics beyond that of a single strip.

Figure 29:
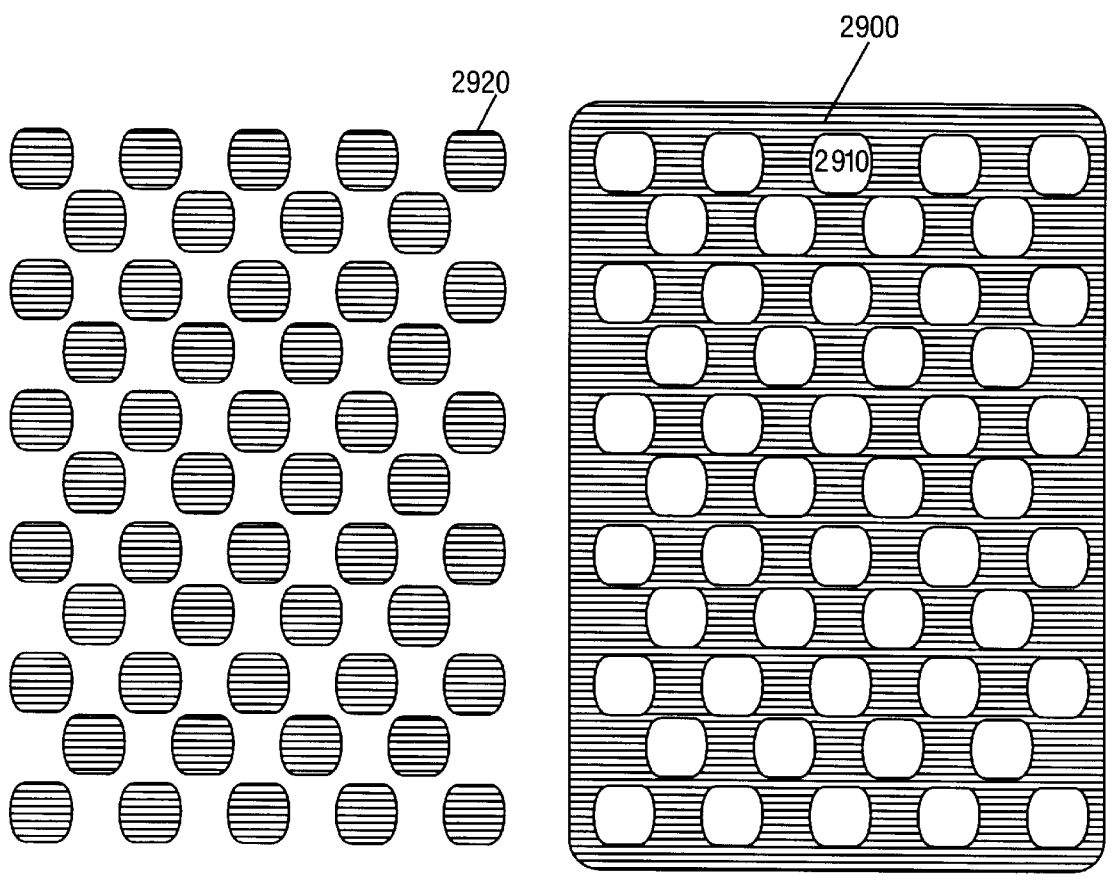
FIG. 29 illustrates rounded square patterned appliqués formed from a wide strip.

FIG. 29 illustrates rounded square patterned appliqués formed from a wide strip. In FIG. 29, wide strip 2900 has nine rows of rounded square cavities 2910 formed according to the present invention to provide an enhanced gripping surface. Thus, additional edges are incorporated into strip 2900 by making cut outs 2910 of sufficient size to permit the flesh to conform to the cavities 2910 and to grab the edges of the cavities 2910.

Furthermore, in an embodiment wherein cavities 2910 are die-cut from wide strip 2900, the portions of strip 2900 that are cut away are used to form rounded square tabs 2920. Then, in one embodiment, additional effective gripping surfaces are created by affixing a pattern of tabs 2920 as shown in FIG. 29 that are made of the antislip material. The pattern of the tabs 2920 is formed such that the shapes provide multiple edges and textured surfaces thereby allowing the flesh to conform over multiple edges and surfaces to provide antislip characteristics beyond that of a single strip.

Figure 30:
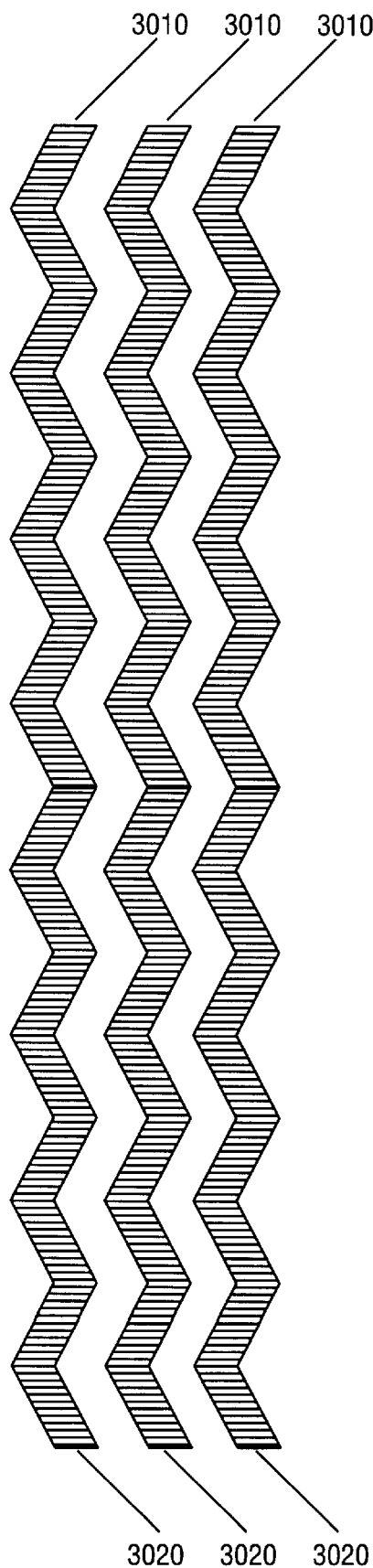
FIG. 30 illustrates additional zig-zag patterned appliqués.

FIG. 30 illustrates additional zig-zag patterned appliqués. Note that short strips can be formed from a long strip. Thus a set of six short strips can be formed from strips 3010 and 3020. Alternately, three long strips can be formed by concatenating a strip 3010 and with a strip 3020.

Figure 31:
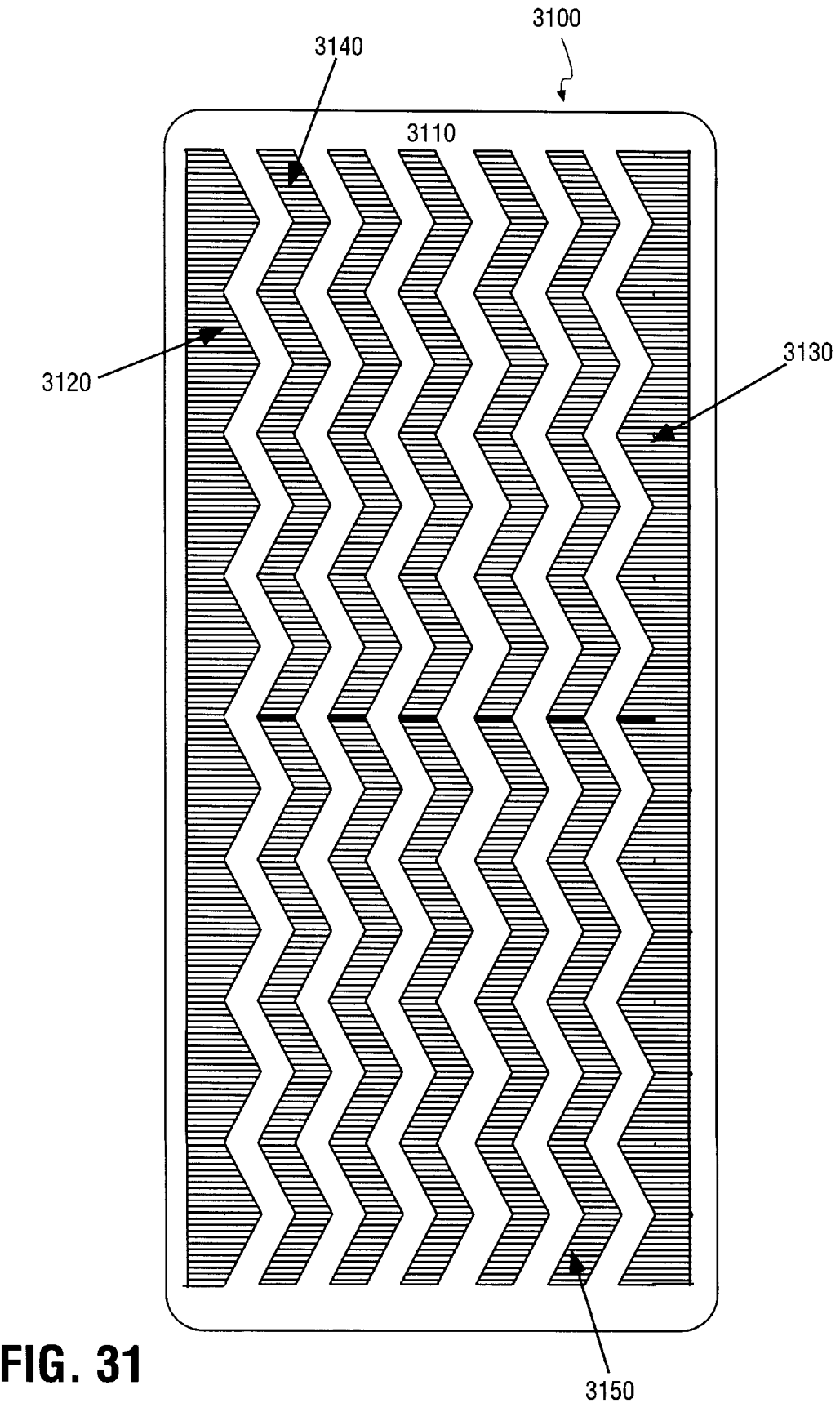
FIG. 31 illustrates yet more zig-zag patterned appliqués.

FIG. 31 illustrates yet more zig-zag patterned appliqués. In FIG. 31, a single wide strip of appliqué 3100 is die-cut into several different shaped tabs 3110, 3120, 3130, 3140 and 3150 that can be affixed to a portable computer. Note again that short strips can be formed from a long strip. Thus a set of ten short strips can be formed from strips 3140 and 3150. Alternately, five long strips can be formed by concatenating a strip 3140 and with a strip 3140. Also note that strip 3110 is formed when strips 3120, 3130, 3140 and 3150 are cut away from strip 3100 and provides an automatically spaced frame of several zig-zag strips.

Figure 32:
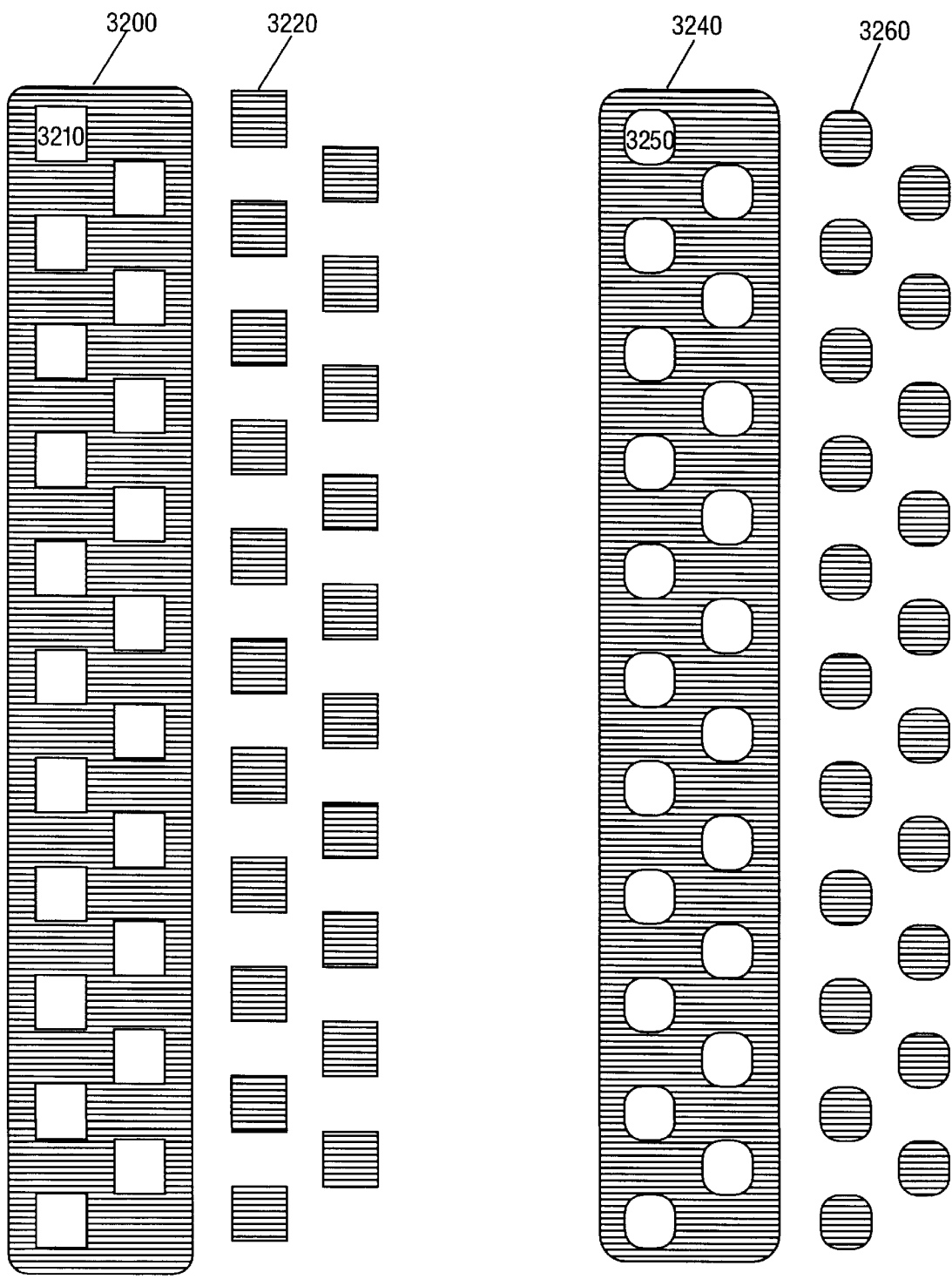
FIG. 32 illustrates square and rounded square patterned appliqués.

FIG. 32 illustrates square and rounded square patterned appliqués. In FIG. 32, strip 3200 has two rows of square cavities 3210 formed according to the present invention to provide an enhanced gripping surface. Thus, additional edges are incorporated into strip 3200 by making cut outs 3210 of sufficient size to permit the flesh to conform to the cavities 3210 and to grab the edges of the cavities 3210.

Furthermore, in an embodiment wherein cavities 3210 are die-cut from strip 3200, the portions of strip 3200 that are cut away are used to form square tabs 3220. Then, in one embodiment, additional effective gripping surfaces are created by affixing a pattern of tabs 3220 as shown in FIG. 32 that are made of the antislip material. The pattern of the tabs 3220 is formed such that the shapes provide multiple edges and textured surfaces thereby allowing the flesh to conform over multiple edges and surfaces to provide antislip characteristics beyond that of a single strip.

Also in FIG. 32, strip 3242 has two rows of rounded square cavities 3250 formed according to the present invention to provide an enhanced gripping surface. Thus, additional edges are incorporated into strip 3240 by making cut outs 3250 of sufficient size to permit the flesh to conform to the cavities 32500 and to grab the edges of the cavities 3260.

Figure 33:
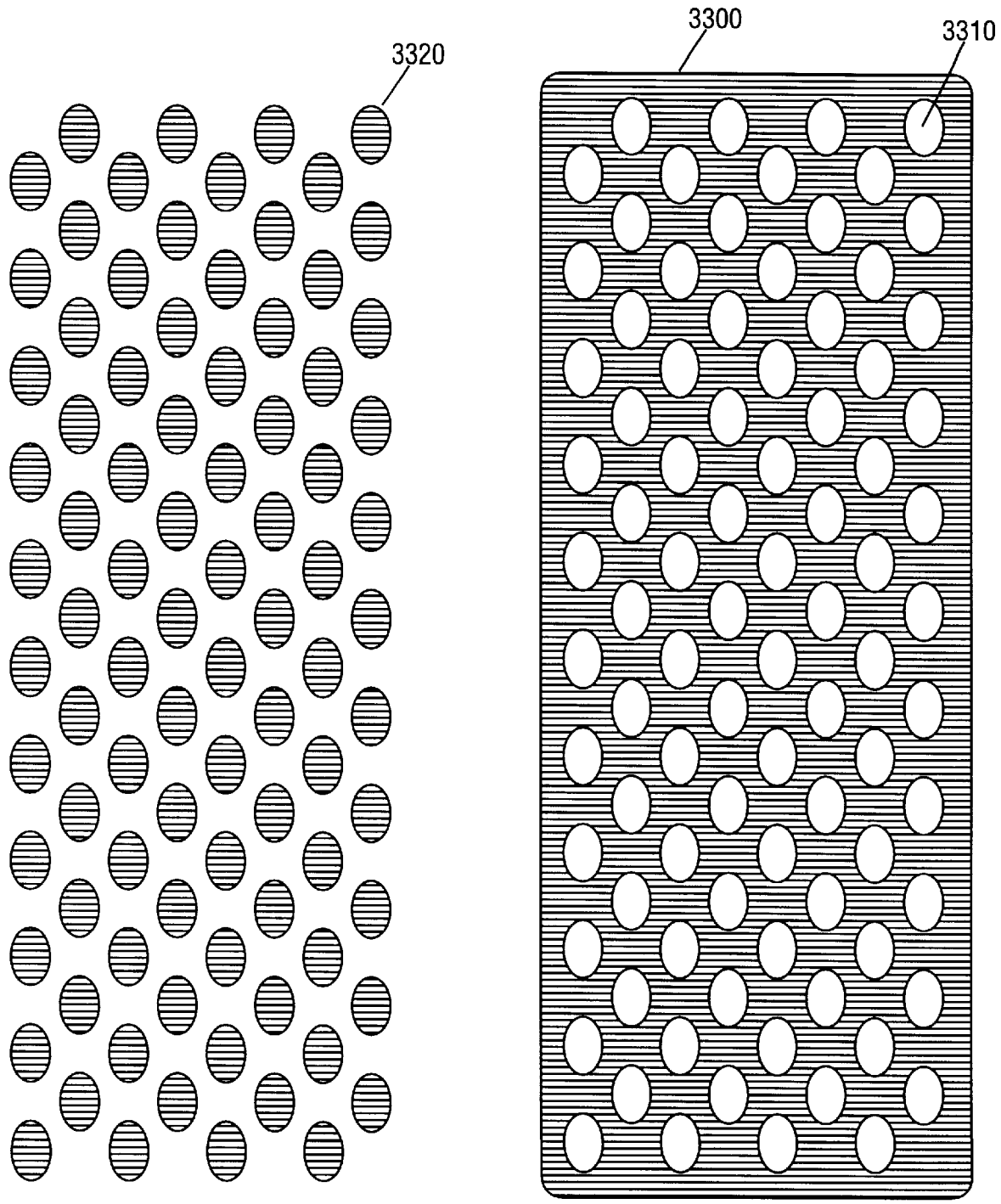
FIG. 33 illustrates oval patterned appliqués.

Furthermore, in an embodiment wherein cavities 3250 are die-cut from strip 3240, the portions of strip 3240 that are cut away are used to form rounded square tabs 3260. Then, in one embodiment, additional effective gripping surfaces are created by affixing a pattern of tabs 3260 as shown in FIG. 32 that are made of the antislip material. The pattern of the tabs 3260 is formed such that the shapes provide multiple edges and textured surfaces thereby allowing the flesh to conform over multiple edges and surfaces to provide antislip characteristics beyond that of a single strip. In contrast to square tabs 3220, because rounded square tabs 3240 have rounded corners, there are no pointed regions that can provide potential areas wherein they can easily be pried away from the surface to which the have been attached FIG. 33 illustrates oval patterned appliqués. In FIG. 33, an embodiment is shown wherein strip 3300 has eight rows of offset oval cavities 3310 formed according to the present invention to provide an enhanced gripping surface. Thus, additional edges are incorporated into wider strip 3300 by making cut outs 3310 of sufficient size to permit the flesh to conform to the cavities 3310 and to grab the edges of the cavities 3310.

Furthermore, in an embodiment wherein cavities 3310 are die-cut from wide strip 3300, the portions of wide strip 3300 that are cut away are used to form oval patterned tabs 3320. Then, in one embodiment, additional effective gripping surfaces are created by affixing a pattern of tabs 3320 as shown in FIG. 33 that are made of the antislip material. The pattern of the tabs 3320 is formed such that the shapes provide multiple edges and textured surfaces thereby allowing the flesh to conform over multiple edges and surfaces to provide antislip characteristics beyond that of a single strip.

While the apparatus of the present invention has been described in terms of its presently preferred and alternate embodiments, those skilled in the art will recognize that the present invention may be practiced with modification and alternation within the spirit and scope of the appended claims. The present invention has utility beyond providing an enhanced grasping surface to a portable computer. For example, the present invention can be employed to provide an enhanced grasping surface to other electronic components such as cellular phones and remote control units. The present invention can also be employed to provide an enhanced grasping surface to non-electronic units that have smooth and/or slippery surfaces such as athletic equipment and tools. The specifications and drawings are, accordingly, to be regarded in an illustrative rather than a restrictive sense.

What is claimed is:

1. An apparatus comprising:

a portable electronic unit having a first exterior surface; and at least one slip resistant applique adhesively attached to the first exterior surface of the portable electronic unit.

2. The apparatus of claim 1, comprising a first slip resistant applique and a second slip resistant applique, the first and second slip resistant appliqués being adhesively attached to a first exterior surface of the portable electronic unit and positioned on the first exterior surface such that a first portion of the finger contacts the first slip resistant applique and a second portion of the finger contacts the second slip resistant applique while the opposing thumb contacts a second exterior surface of the portable electronic unit when grasping the portable electronic unit, the first and second slip resistant appliques being separated on the first exterior surface so as to form a gap between the first and second appliques into which a third portion of the finger between the first and second portions will conform and thereby contact opposing edges of the first and second appliques the opposing edges of the first and second appliques forming a mechanical stop as an aid in grasping the portable electronic unit when the first portion of the finger contacts the first applique and the second portion of the finger contacts the second applique.

3. The apparatus of claim 2, wherein the first and second appliques have a serpentine shape thereby permitting the first portion to contact the first applique while the second portion contacts the second applique when the unit is grasped from more than one direction.

4. The apparatus of claim 2, wherein the first and second appliques have a zig-zag shape thereby permitting the first portion to contact the first applique while the second portion contacts the second applique when the unit is grasped from more than one direction.

5. The apparatus of claim 1, wherein the portable electronic unit is a computer.

* * * * *